US009075369B2

(12) United States Patent
Fukutani et al.

(10) Patent No.: US 9,075,369 B2

(45) Date of Patent: Jul. 7, 2015

(54) IMAGE FORMING APPARATUS AND IMAGE FORMING METHOD BASED ON VARIATION OF MOTOR ROTATION SPEED

(71) Applicant: CANON KABUSHIKI KAISHA, Tokyo (JP)

(72) Inventors: Takayuki Fukutani, Susono (JP); Yuuji Takayama, Suntou-gun (JP); Tomoyuki Saiki, Suntou-gun (JP); Tae Matsumoto, Yokohama (JP); Yuichi Ogawa, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/914,914

(22) Filed: Jun. 11, 2013

(65) Prior Publication Data

US 2013/0272728 A1 Oct. 17, 2013

Related U.S. Application Data

(63) Continuation of application No. 12/825,104, filed on Jun. 28, 2010, now Pat. No. 8,483,587.

(30) Foreign Application Priority Data

Jun. 30, 2009 (JP) ................................ 2009-155308
May 31, 2010 (JP) ................................ 2010-125245

(51) Int. Cl.

| | |
|---|---|
| ***G03G 15/00*** | (2006.01) |
| ***H02P 6/00*** | (2006.01) |
| ***G03G 15/01*** | (2006.01) |
| ***G03G 15/16*** | (2006.01) |

(52) U.S. Cl.

CPC ........ *G03G 15/5008* (2013.01); *G03G 15/0131* (2013.01); *G03G 2215/00059* (2013.01); *G03G 2215/0129* (2013.01); *G03G 2215/0164* (2013.01); *G03G 15/1615* (2013.01); *G03G 15/5058* (2013.01); *G03G 15/0194* (2013.01)

(58) Field of Classification Search

CPC ........................ B65H 2220/01; B65H 2220/02
USPC ........................................ 399/49; 318/400.01
See application file for complete search history.

(56) References Cited

U.S. PATENT DOCUMENTS

| | | | | |
|---|---|---|---|---|
| 4,942,325 | A * | 7/1990 | Fukaya | 310/257 |
| 8,483,587 | B2 * | 7/2013 | Fukutani et al. | 399/49 |
| 2002/0159791 | A1 * | 10/2002 | Chen et al. | 399/167 |
| 2003/0016960 | A1 * | 1/2003 | Stelter et al. | 399/49 |
| 2004/0253013 | A1 * | 12/2004 | Furukawa | 399/49 |
| 2006/0024104 | A1 * | 2/2006 | Castelli et al. | 399/372 |
| 2007/0172257 | A1 * | 7/2007 | Matsuda et al. | 399/167 |
| 2007/0236747 | A1 * | 10/2007 | Paul | 358/3.26 |
| 2009/0238613 | A1 * | 9/2009 | Ueda et al. | 399/301 |

FOREIGN PATENT DOCUMENTS

JP 2000356929 A * 12/2000

* cited by examiner

*Primary Examiner* — David Gray
*Assistant Examiner* — Tyler Hardman
(74) *Attorney, Agent, or Firm* — Canon USA Inc. IP Division

(57) ABSTRACT

An apparatus includes an image formation unit including a photosensitive drum and a motor for driving the image formation unit. The apparatus acquires a frequency generator signal, which is phase information output from the motor as the motor rotates. In addition, the apparatus corrects unevenness of the density that may occur due to the rotation of the motor according to the acquired phase information.

14 Claims, 25 Drawing Sheets

TIMING CHART OF PROCESSING FOR INITIALIZING PHASE INFORMATION (FG SIGNAL)

TEST PATCH EXPOSURE TIMING CHART

FIG.11A

W1

| FG SIGNAL COUNT (PHASE) | DENSITY VALUE |
|---|---|
| 0 | 10.000 |
| 1 | 10.098 |
| 2 | 10.191 |
| 3 | 10.278 |
| 4 | 10.354 |
| 5 | 10.416 |
| 6 | 10.462 |
| 7 | 10.490 |
| 8 | 10.500 |
| 9 | 10.490 |
| ⋮ | ⋮ |
| 30 | 9.809 |
| 31 | 9.902 |

(TABLE A)

CALCULATE DIFFERENCE FROM AVERAGE DENSITY →

| FG SIGNAL COUNT (PHASE) | DIFFERENCE (Δd1) |
|---|---|
| 0 | 0.000 |
| 1 | 0.098 |
| 2 | 0.191 |
| 3 | 0.278 |
| 4 | 0.354 |
| 5 | 0.416 |
| 6 | 0.462 |
| 7 | 0.490 |
| 8 | 0.500 |
| 9 | 0.490 |
| ⋮ | ⋮ |
| 30 | -0.191 |
| 31 | -0.098 |

(TABLE B)

FIG.11B

W4

| FG SIGNAL COUNT (PHASE) | DENSITY VALUE |
|---|---|
| 0 | 10.000 |
| 1 | 10.141 |
| 2 | 10.200 |
| 3 | 10.141 |
| 4 | 10.000 |
| 5 | 9.859 |
| 6 | 9.800 |
| 7 | 9.859 |
| 8 | 10.000 |
| 9 | 10.141 |
| ⋮ | ⋮ |
| 30 | 9.800 |
| 31 | 9.859 |

(TABLE A)

CALCULATE DIFFERENCE FROM AVERAGE DENSITY →

| FG SIGNAL COUNT (PHASE) | DIFFERENCE (Δd2) |
|---|---|
| 0 | 0.000 |
| 1 | 0.141 |
| 2 | 0.200 |
| 3 | 0.141 |
| 4 | 0.000 |
| 5 | -0.141 |
| 6 | -0.200 |
| 7 | -0.141 |
| 8 | 0.000 |
| 9 | 0.141 |
| ⋮ | ⋮ |
| 30 | -0.200 |
| 31 | -0.141 |

(TABLE B)

FIG.11C

TOTAL DIFFERENCE OF W1 AND W4

| FG SIGNAL COUNT (PHASE) | TOTAL DIFFERENCE VALUE |
|---|---|
| 0 | 0.000 |
| 1 | 0.239 |
| 2 | 0.391 |
| 3 | 0.419 |
| 4 | 0.354 |
| 5 | 0.274 |
| 6 | 0.262 |
| 7 | 0.349 |
| 8 | 0.500 |
| 9 | 0.632 |
| ⋮ | ⋮ |
| 30 | -0.391 |
| 31 | -0.239 |

(TABLE C)

CALCULATE CORRECTION INFORMATION BASED ON COMBINED DIFFERENCE

W1-W4 COMBINED CORRECTION INFORMATION

| FG SIGNAL COUNT (PHASE) | CORRECTION INFORMATION |
|---|---|
| 0 | 1.000 |
| 1 | 0.977 |
| 2 | 0.962 |
| 3 | 0.960 |
| 4 | 0.966 |
| 5 | 0.973 |
| 6 | 0.974 |
| 7 | 0.966 |
| 8 | 0.952 |
| 9 | 0.941 |
| ⋮ | ⋮ |
| 30 | 1.041 |
| 31 | 1.024 |

(TABLE D)

FIG.17A
| DENSITY DIFFERENCE ΔDn | LINE INTERVAL ADJUSTMENT AMOUNT ΔLn [μm] |
|---|---|
| -1 | 8.000 |
| -0.95 | 7.600 |
| -0.9 | 7.200 |
| : | : |
| : | : |
| -0.5 | 4.000 |
| : | : |
| : | : |
| -0.05 | 0.400 |
| 0 | 0.000 |
| 0.05 | -0.400 |
| : | : |
| : | : |
| 0.5 | -4.000 |
| : | : |
| : | : |
| 0.9 | -7.200 |
| 0.95 | -7.600 |
| 1 | -8.000 |
FIG.17B
FIG.17C
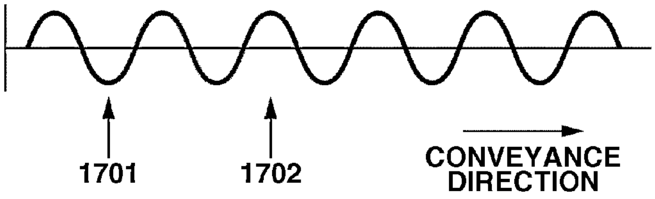

FIG.18

| FG COUNT VALUE (PHASE) | DENSITY DIFFERENCE ΔDn | LINE INTERVAL ADJUSTMENT AMOUNT ΔLn [μm] |
|---|---|---|
| 0 | 0.000 | 0.000 |
| 1 | 0.239 | -1.912 |
| 2 | 0.391 | -3.131 |
| 3 | 0.419 | -3.354 |
| 4 | 0.354 | -2.828 |
| 5 | 0.274 | -2.195 |
| 6 | 0.262 | -2.096 |
| 7 | 0.349 | -2.792 |
| 8 | 0.500 | -4.000 |
| 9 | 0.632 | -5.055 |
| 10 | 0.662 | -5.296 |
| 11 | 0.557 | -4.457 |
| 12 | 0.354 | -2.828 |
| 13 | 0.136 | -1.091 |
| 14 | -0.009 | 0.069 |
| 15 | -0.044 | 0.351 |
| 16 | 0.000 | 0.000 |
| 17 | 0.044 | -0.351 |
| 18 | 0.009 | -0.069 |
| 19 | -0.136 | 1.091 |
| 20 | -0.354 | 2.828 |
| 21 | -0.557 | 4.457 |
| 22 | -0.662 | 5.296 |
| 23 | -0.632 | 5.055 |
| 24 | -0.500 | 4.000 |
| 25 | -0.349 | 2.792 |
| 26 | -0.262 | 2.096 |
| 27 | -0.274 | 2.195 |
| 28 | -0.354 | 2.828 |
| 29 | -0.419 | 3.354 |
| 30 | -0.391 | 3.131 |
| 31 | -0.239 | 1.912 |

FIG.19

1901 1902 1903

| FG COUNT VALUE n | CUMULATIVE LOCATION VARIATION ΔLns [μm] | LOCATION VARIATION AMOUNT ΔPn [LINE] | LOCATION CORRECTION AMOUNT ΔP'n [LINE] |
|---|---|---|---|
| 3 | 0 | 0.000 | 0.000 |
| 4 | -2.828 | -0.067 | 0.067 |
| 5 | -5.023 | -0.120 | 0.120 |
| 6 | -7.118 | -0.169 | 0.169 |
| 7 | -9.910 | -0.236 | 0.236 |
| 8 | -13.910 | -0.331 | 0.331 |
| 9 | -18.965 | -0.452 | 0.452 |
| 10 | -24.260 | -0.578 | 0.578 |
| 11 | -28.718 | -0.684 | 0.684 |
| 12 | -31.546 | -0.751 | 0.751 |
| 13 | -32.637 | -0.777 | 0.777 |
| 14 | -32.568 | -0.775 | 0.775 |
| 15 | -32.217 | -0.767 | 0.767 |
| 16 | -32.217 | -0.767 | 0.767 |
| 17 | -32.568 | -0.775 | 0.775 |
| 18 | -32.637 | -0.777 | 0.777 |
| 19 | -31.546 | -0.751 | 0.751 |
| 20 | -28.718 | -0.684 | 0.684 |
| 21 | -24.260 | -0.578 | 0.578 |
| 22 | -18.965 | -0.452 | 0.452 |
| 23 | -13.910 | -0.331 | 0.331 |
| 24 | -9.910 | -0.236 | 0.236 |
| 25 | -7.118 | -0.169 | 0.169 |
| 26 | -5.023 | -0.120 | 0.120 |
| 27 | -2.828 | -0.067 | 0.067 |
| 28 | 0.000 | 0.000 | 0.000 |
| 29 | 3.354 | 0.080 | -0.080 |
| 30 | 6.484 | 0.154 | -0.154 |
| 31 | 8.396 | 0.200 | -0.200 |
| 0 | 8.396 | 0.200 | -0.200 |
| 1 | 6.484 | 0.154 | -0.154 |
| 2 | 3.354 | 0.080 | -0.080 |
| 3 | 0.000 | 0.000 | 0.000 |
| : | : | : | : |

IMAGE FORMING APPARATUS AND IMAGE FORMING METHOD BASED ON VARIATION OF MOTOR ROTATION SPEED

CROSS-REFERENCE TO RELATED APPLICATION

This application is a Continuation of U.S. application Ser. No. 12/825,104, filed Jun. 28, 2010, which claims priority from Japanese Patent Application No. 2009-155308 filed Jun. 30, 2009 and No. 2010-125245 filed May 31, 2010, which are hereby incorporated by reference herein in their entirety.

BACKGROUND OF THE INVENTION

1. Field of the Invention

The present invention relates to an image quality stabilization method for an image forming apparatus.

2. Description of the Related Art

In recent years, with the widespread use of electrophotographic type image forming apparatuses and inkjet type image forming apparatuses, it may be desired by the market that an image forming apparatus is capable of forming an image of a high image quality. The image quality may be caused by density unevenness (a phenomenon so-called "banding") of a sheet in its conveyance direction (in a sub scanning direction).

In order to suppress degradation of image quality caused by density unevenness, Japanese Patent Application Laid-Open No. 2007-108246 discusses a method for suppressing density unevenness occurring in the sub scanning direction. The method discussed in Japanese Patent Application Laid-Open No. 2007-108246 measures density unevenness in the sub scanning direction, which may occur according to an outer diameter period of a photosensitive drum, in advance in relation to the phase of the photosensitive drum. In addition, this conventional method stores a result of the measurement in a storage unit as a density pattern information table. Furthermore, the conventional method reads information about the density unevenness, which is measured according to the phase of the photosensitive drum during image formation processing, from the density pattern information table. Moreover, the conventional method corrects the density unevenness that may occur according to the outer diameter rotational period of the photosensitive drum by using the information about the density unevenness.

After examining an image quality that can be achieved according to the above-described conventional method, it was found by the applicant of the present invention that unevenness of rotation of a motor that drives a photosensitive drum (periodical variation of the rotational speed) should be considered as a cause of density unevenness occurring in the sub scanning direction. To paraphrase this, when a motor is driven and rotated, rotational unevenness of the motor may arise due to the configuration of the motor itself, i.e., the number of magnetized poles thereof. Furthermore, the motor rotation unevenness may lead to density unevenness, which may cause image degradation.

On the other hand, the above-described method discussed in Japanese Patent Application Laid-Open No. 2007-108246 can correct density unevenness that may occur according to an outer diameter period of the photosensitive drum but cannot correct density unevenness that may occur in a short period, which may be caused by rotational unevenness of a motor. More specifically, if the manufacture accuracy of mechanical parts related to a motor is low due to reduction of costs of manufacture of the motor, the density unevenness occurring in a short rotational period of a motor may increase. In other words, in this case, in order to achieve a high quality image, effectively reducing density unevenness that may arise due to rotational unevenness of a motor is to be performed.

SUMMARY OF THE INVENTION

According to an aspect of the present invention, an apparatus including an image forming unit configured to execute image forming and a motor configured to drive a rotation member included in the image forming unit includes an identification unit configured to identify a phase of variation of rotation speed of the motor according to a signal that is output at least once during one rotation of the motor, and a correction unit configured to cause the image forming unit to execute image forming including correction of a density according to the phase based on the identified variation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 11A through 11C illustrate an example of an exposure output correction table used in correcting banding according to a phase of motor rotation unevenness.

FIGS. 17A and 17B illustrate an example of a table storing correspondence between density difference ΔDn and line interval adjustment amount ΔLn. FIG. 17C, illustrates an example of the periodic variation of the density due to the rotation unevenness of the motor.

FIG. 18 illustrates an example of a table storing correspondence between an FG count value n and the line interval adjustment amount ΔLn.

FIG. 19 illustrates an example of a table storing correspondence between an FG count value n and a location correction amount ΔP'n.

DESCRIPTION OF THE EMBODIMENTS

Various exemplary embodiments, features, and aspects of the invention will be described in detail below with reference to the drawings.

Now, an image forming apparatus according to an exemplary embodiment of the present invention configured to correct banding will be described in detail below. However, components, units, method, and the like according to the present exemplary embodiment are mere examples. In other words, those described in the present exemplary embodiment do not limit the scope of the present invention. In the following description of the present invention, exemplary configurations will be described in the following order.

(1) To begin with, in a first exemplary embodiment of the present invention, an exemplary hardware configuration of the image forming apparatus will be described in detail with reference to FIGS. 1 and 2, and FIGS. 3A through 3E. In addition, an exemplary hardware block diagram will be described with reference to FIGS. 4A through 4C and FIG. 5. Furthermore, an exemplary functional block diagram, which illustrates primary functions of the image forming apparatus, will be described in detail below with reference to FIGS. 6A and 6B.

(2) Subsequently, processing for generating a table illustrating a correspondence relation between rotational unevenness of a motor and density correction information used for correcting banding that may be caused by the rotational unevenness of the motor will be described in detail with reference to a flow chart illustrated in FIG. 7, which illustrates an exemplary flow of processing for generating an exposure output correction table. In the present exemplary embodiment, "rotational unevenness of a motor" refers to periodic variation of the rotational speed of a motor as illustrated in FIG. 8. In the present exemplary embodiment, the periodic variation of the rotational speed of a motor will be simply referred to as "(motor) rotation unevenness". Furthermore, the processing for generating an exposure output correction table illustrated in FIG. 7 will be described in further detail with reference to timing charts illustrated in FIGS. 8, 9A, and 9B.

(3) In addition, an exemplary method for correcting banding, which may be caused by periodic rotation unevenness of a motor and is corrected by using density correction information (table) for correcting banding stored within the image forming apparatus during image forming (exposure) processing, will be described in detail.

(4) In a second exemplary embodiment of the present invention, a method for correcting banding, which is implemented by changing the barycenter of an image, will be described.

(5) In addition, various modifications of the present invention will be described.

<Cross Section of Image Forming Apparatus>

Figure 1:
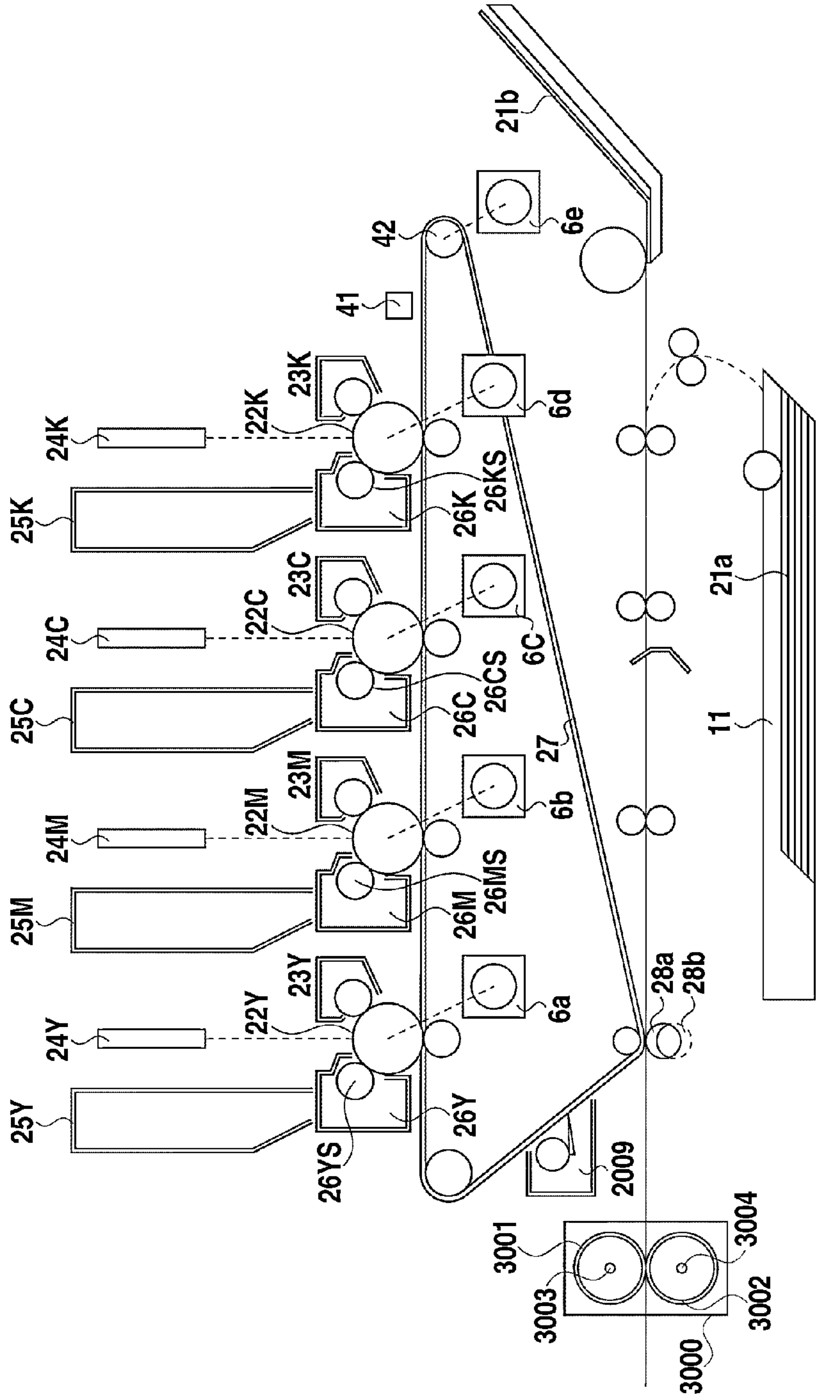
FIG. 1 is a cross section illustrating an example of a color image forming apparatus.

FIG. 1 is a cross section illustrating an example of a color image forming apparatus according to the first exemplary embodiment of the present invention. In the present exemplary embodiment, the color image forming apparatus forms an electrostatic latent image by using exposure light emitted according to image information supplied from an image processing unit (not illustrated in FIG. 1). In addition, the image forming apparatus according to the present exemplary embodiment forms a single-color toner image by developing the electrostatic latent image. Furthermore, the image forming apparatus forms color toner images (each of single color toner images) in a mutually overlapped manner and transfers the same on the transfer material 11. Moreover, the image forming apparatus fixes multi-color toner images on the transfer material 11. The processing described briefly above will be described in detail below.

Referring to FIG. 1, a transfer material 11 is fed from a paper feed unit 21*a* or 21*b*. Photosensitive drums (photosensitive members) 22Y, 22M, 22C, and 22K include an aluminum cylinder, which is coated with an organic photo-conductor (OPC) layer on its outer periphery. Driving motors 6*a* through 6*d* provide driving force to the photosensitive drum 22Y through 22K respectively. The photosensitive drums 2Y through 2K are driven by the drive motors 6*a* through 6*d* respectively. Four charging devices 23Y, 23M, 23C, and 23K correspond to yellow (Y), magenta (M), cyan (C), and black (K), respectively. Each charging device 23 includes a sleeve as indicated by a circular section in FIG. 1.

Exposure light is emitted from scanner units 24Y, 24M, 24C, and 24K. The scanner units 24Y, 24M, 24C, and 24K selectively expose the surface of the photosensitive drums 22Y, 22M, 22C, and 22K to form electrostatic latent images. The photosensitive drums 22Y through 22K rotate with a constant decentering component. However, at the timing of forming the electrostatic latent image, the phase of each photosensitive drum 22 is adjusted in advance so that the same decentration effect is achieved at a transfer unit.

A development unit 26Y, 26M, 26C, and 26K develop toners to visualize the electrostatic latent images by using recording agents supplied from toner cartridges 25Y, 25M, 25C, and 25K. Four development units 26Y, 26M, 26C, and 26K correspond to yellow (Y), magenta (M), cyan (C), black (K), respectively. The development units 26Y through 26K are provided with sleeves 26YS, 26MS, 26CS, and 26KS, respectively. Each development unit is detachably provided to the image forming apparatus.

An intermediate transfer member 27 contacts the photosensitive drums 22Y, 22M, 22C, and 22K. Furthermore, the intermediate transfer member 27 is rotated clockwise by an intermediate transfer member driving roller 42 during color image formation processing. In addition, the intermediate transfer member 27 rotates according to the rotation of the photosensitive drums 22Y, 22M, 22C, and 22K. During one rotation of the intermediate transfer member 27, a toner image of each color is transferred thereon. Subsequently, a transfer roller 28 comes in contact with the intermediate transfer member 27 to convey the transfer material 11 pinched between them. Thus, a multicolor toner image is transferred from the intermediate transfer member 27 onto the transfer material 11. During transfer of the multicolor toner image onto the transfer material 11, the transfer roller 28 contacts to the transfer material 11 at a position 28*a* and is moved to separate from the transfer material 11 to a position 28*b* after printing is completed.

A fixing device 3000 causes the transferred multicolor toner image to be fused and fixed while conveying the transfer material 11 therethrough. In the example illustrated in FIG. 1, the fixing device 3000 includes a fixing roller 3001, which applies heat to the transfer material 11, and a pressure roller 3002, which causes the transfer material 11 to come in press-contact with the fixing roller 3001. The fixing roller 3001 and the pressure roller 3002 have a hollow body and have heaters 3003 and 3004 in their inside.

More specifically, the transfer material 11 having the multicolor toner image transferred thereon is applied with heat and pressure, and the toner is fixed on the surface of the transfer material 11 while being conveyed by the fixing roller 3001 and the pressure roller 3002. After the toner image is fixed on the transfer material 11, the transfer material 11 is discharged on a paper discharge tray (not illustrated) by a paper discharge roller (not illustrated). Then, the image formation processing ends.

A cleaning unit 2009 cleans the toner remaining on the intermediate transfer member 27 after the image formation processing. The cleaning unit 2009 includes a waste toner container, which contains waste toners left after the multicolor (four-color) toner images formed on the intermediate transfer member 27 is transferred on the transfer material 11. A density sensor 241 (optical characteristic detection sensor) is provided within the image forming apparatus illustrated in FIG. 1 so as to face the intermediate transfer member 27. The density sensor 241 measures the density of a test patch formed on the surface of the intermediate transfer member 27.

In the example illustrated in FIG. 1, the color image forming apparatus includes the intermediate transfer member 27. However, the present exemplary embodiment is not limited to this. More specifically, the present exemplary embodiment can be applied to an image forming apparatus that uses a primary transfer method, which directly transfers the toner image developed by the development unit 26 onto a recording material. In this case, in the description below, the present invention can be implemented by using a transfer material conveyance belt (a transfer material carrying member) in substitution with the intermediate transfer member 27.

In the cross section illustrated in FIG. 1, each photosensitive drum 22 includes a motor 6, which is a drive unit. However, the present invention is not limited to this. More specifically, it is also useful if the motor 6 is used in common by a plurality of photosensitive drums 22. In the following description, a "conveyance direction" or "sub scanning direction" refers to a direction of conveying a transfer material or a direction of rotation of the intermediate transfer member, which direction being perpendicular to a main scanning direction of an image when viewed from above.

<Configuration of Density Sensor 241>

Figure 2A:
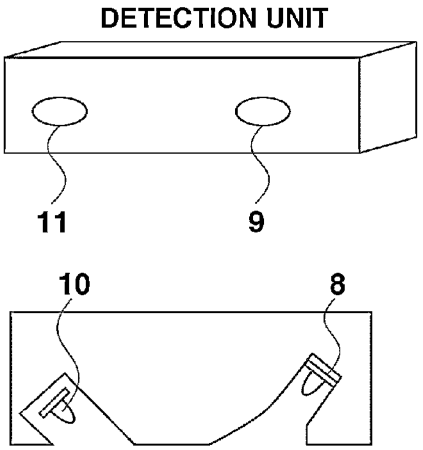
FIGS. 2A and 2B illustrate an example of an optical characteristic detection sensor.

Now, an exemplary configuration of the density sensor 241 will be described in detail below with reference to FIGS. 2A and 2B. Referring to FIG. 2A, the density sensor 241 includes a light-emitting diode (LED) 8, which is a light emission element, and a photo transistor 10, which is a light-sensitive element. In the present exemplary embodiment, irradiation light emitted from the LED 8 passes through a slit 9, which reduces diffused light, and reaches the surface of the intermediate transfer member 27. An opening 11 reduces irregular reflection light. The light-sensitive element 10 receives a regular reflection component.

Figure 2B:
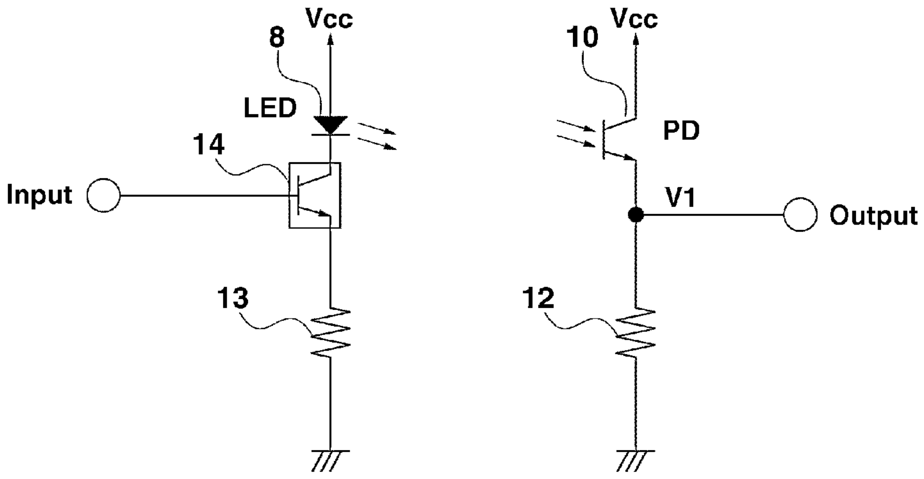

FIG. 2B illustrates an exemplary circuitry configuration of the density sensor 241. Referring to FIG. 2B, a resistor 12 divides the voltage of the light-sensitive element 10 and a supply voltage Vcc to a partial voltage. A resistor 13 restricts current for driving the LED 8. A transistor 14 switches on/off the LED 8 according to the signal from a central processing unit (CPU) 21. In the exemplary circuit illustrated in FIG. 2B, if the amount of regular reflection light from the toner image when light is emitted from the LED 8 is large, the level of the current flowing into the light-sensitive element 10 becomes high. Accordingly, in this case, a value of the voltage V1, which is detected as an output thereof, becomes large. In other words, in the example illustrated in FIG. 2B, if the density of a test patch is low and the level of the regular reflection light is high, then a detected voltage V1 becomes high. On the other hand, if the density of a test patch is high and the level of the regular reflection light is low, then a detected voltage V1 becomes low.

<Configuration of Motor 6>

Now, an exemplary configuration of a motor, which is a generation source of the banding to be corrected, will be described in detail below. To begin with, a general configuration of the motor 6 will be described in detail with reference to FIGS. 3A through 3D. Then, how periodic rotation unevenness occurs in the motor 6 will be described in detail with reference to FIG. 3E.

<General Configuration of Motor>

Figure 3A:
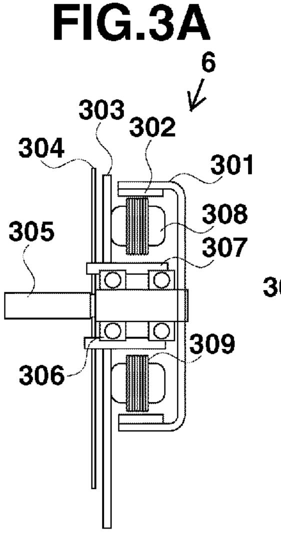
FIGS. 3A through 3E illustrate an exemplary hardware configuration of a motor.
Figure 3B:
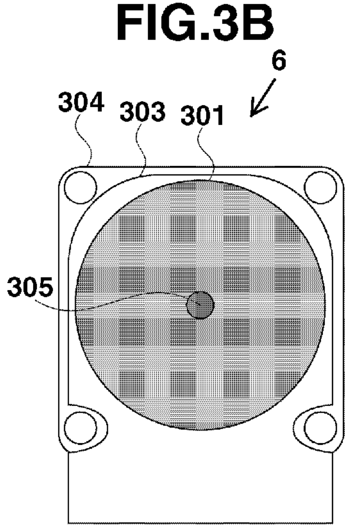
Figure 3C:
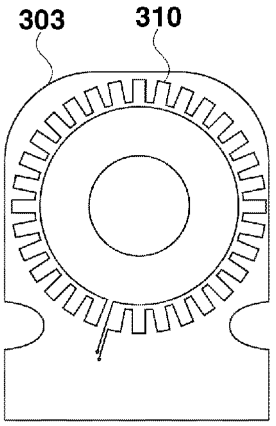

FIG. 3A is a cross section of the motor 6. FIG. 3B is a front view of the motor 6. FIG. 3C illustrates an example of a circuit board 303 of the motor 6. In the present exemplary embodiment, various motors included in an image forming unit, such as the motors 6*a* through 6*d* that drive the photosensitive drums 22 and a motor 6*e* that drives the drive roller 42, can be used as the motor 6.

Referring to FIGS. 3A and 3B, a rotor magnet 302, which includes a permanent magnet, is mounted inside a rotor frame 301. A coil 309 is wound around a stator 308. In addition, a plurality of stators 308 is provided on an inner periphery of the rotor frame 301.

A shaft 305 transmits the torque to the outside thereof. More specifically, the torque is transmitted to a counterpart gear by using a gear including a processed shaft 305 or by using a gear including polyoxymethylene (POM) that is inserted in the shaft 305. A housing 307 fixes a bearing 306 and is engaged to a mounting plate 304.

On the other hand, as illustrated in FIG. 3C, an FG pattern (speed detection pattern) 310 is printed on the surface of the circuit board 303 facing the rotor in a ring-like shape so as to face an FG magnet 311. On the other surface of the circuit board 303, a drive control circuit parts (not illustrated) are mounted.

The drive control circuit parts include a control integrated circuit (IC), a plurality of Hall devices (e.g., three Hall devices), a resistor, a condenser, a diode, and a metal oxide semiconductor field-effect transistor (MOSFET). The control IC (not illustrated) changes the coil to supply current to and the direction of the current that flows therethrough according to positional information about the rotor magnet 302. Thus, the control IC (not illustrated) rotates the rotor frame 301 and each of the parts connected to the rotor frame 301.

Figure 3D:
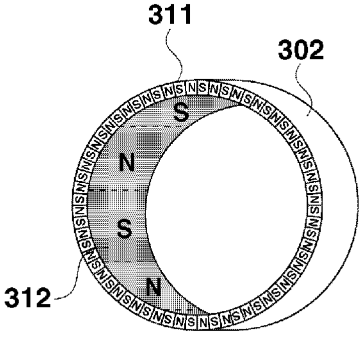

FIG. 3D illustrates an example of the rotor magnet 302 included in the motor 6. An inner peripheral surface of the rotor magnet 302 is magnetized as illustrated by magnetized portions 312. On the edge of an open side of the rotor magnet 302, magnetized portions (an FG magnet 311) are provided. In the present exemplary embodiment, the rotor magnet 302 has magnetized portions for driving including eight poles (including four north poles and four south poles). It is useful if the magnetized portion 312 has magnetized portions of the north pole and the south pole, which are alternately arranged.

On the other hand, the FG magnet 311 has more north and south poles than the number of the magnetized portions for driving (i.e., thirty-two pairs of the north and south poles). For the FG pattern 310, rectangular portions by the number equivalent to the number of magnetized poles of the FG magnet 311 are formed by serially connecting the same in a ring-like shape. In the present exemplary embodiment, the number of magnetized portions for driving and the number of the FG magnets are not limited to the configuration described above. More specifically, it is also useful if arbitrary number of magnetized portions for driving and FG magnets are provided.

In the present exemplary embodiment, the motor 6 illustrated in FIGS. 3A through 3E employs a frequency generator that generates a frequency signal proportional to the rotational speed of the motor 6 (i.e., an FG type motor rotational speed sensor) is used as a speed sensor for detecting the rotational speed of the motor 6. Now, the FG type sensor will be described in detail below.

When the FG magnet 311 rotates uniformly with the rotor frame 301, a sinusoidal signal of a frequency according to the rotational speed is induced due to variation of a relative magnetic flux against the FG magnet 311. The control IC (not illustrated) compares the generated induced voltage and a predetermined threshold value and generates a pulse-like FG signal according to a result of the comparison.

Control of the rotational speed and driving of the motor 6 and various processing, which will be described in detail below, are executed based on the generated FG signal. In the present exemplary embodiment, the sensor for detecting the rotational speed of the motor 6 is not limited to a speed generator. More specifically, it is also useful if a magnetic resistance (MR) sensor or a slit plate encoder type sensor is used as the sensor for the motor 6.

In the present exemplary embodiment, as will be described in detail below, rotation unevenness of the motor 6 is in interlock with periodic density unevenness (banding). In other words, the present exemplary embodiment uses the phase of rotation of the rotation unevenness of the motor 6 in predicting what kind of periodic density unevenness occurs in the motor 6.

The CPU 221 identifies the rotation phase of rotation unevenness based on an FG signal output from the motor 6 as the motor 6 rotates. In identifying the phase of variation of the rotational speed of the motor 6, a signal other than an FG signal, which is output at least once during one rotation of the motor 6, can be used instead of the FG signal. More specifically, it is also useful if the motor 6 is configured so that at least one signal (at least one piece of rotation information) is repeatedly output during one rotation of the motor 6.

Now, how motor rotation unevenness occurs will be described. In general, the magnitude of rotation unevenness that may occur in a period of one rotation of a motor varies according to a configuration of the motor. More specifically, two primary factors, such as the state of magnetization of the rotor magnet 302 (unevenness of magnetization during one rotation of a rotor) and offset between the centers of the rotor magnet 302 and the stator 308, can function as representative factors for the rotation unevenness occurring in a period of one rotation of a motor. This is caused by variation of the total driving force for driving the motor, which is generated in each of the entire stator 308 and the entire rotor magnet 302, within one period of the motor 6.

Figure 3E:
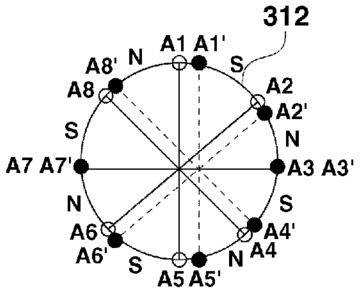

Now, magnetization unevenness will be described in detail below with reference to FIG. 3E. FIG. 3E is a front view of the magnetized portion 312. Referring to FIG. 3E, the polarity varies at boundaries A1 through A8 and A1' through A8'. The boundaries A1 through A8 is provided with the same interval along the circumference of the circular shape formed by the magnetized portion 312. The boundaries A1 through A8 are boundaries between the north pole and the south pole when no magnetization unevenness has occurred. On the other hand, the boundaries A1' through A8' are boundaries between the north pole and the south pole when magnetization unevenness has occurred.

In addition to the above-described cause of motor rotation unevenness, decentering of the motor shaft (pinion gear) 305 may be a cause of the motor rotation unevenness. When the rotation unevenness occurring due to the above-described cause is transmitted to a counterpart rotational member, density unevenness may occur.

The decentering of the motor shaft (pinion gear) 305 has a period of one rotation of the motor 6. When the rotation unevenness caused by the decentering of the motor shaft 305 and the rotation unevenness caused by the magnetization unevenness described above is combined, the combined rotation unevenness is transmitted to a target of transmission of the driving force. Therefore, density unevenness occurs. As described above, rotation unevenness in the period of one rotation of a motor generally occurs.

On the other hand, another rotation unevenness, which is different from the rotation unevenness having the period of one rotation of a rotational member, may occur in the motor 6. More specifically, a motor having, in the rotor magnet 302, eight driving magnetic poles that have been magnetized, has four pairs of the north and the south poles. Accordingly, when the motor is rotated once, variation of magnetic flux for four periods is detected from each Hall device (not illustrated).

If the position of any of the Hall devices is deviated from an ideal position, then the relationship of the phases of the outputs of the Hall devices may vary due to the variation of the magnetic flux occurring in one period. In this case, in executing control of driving of the motor, in which energization of the coil wound around the stator is switched based on an output from each Hall device, the timing for switching the timing of energization of the coil may deviate from an appropriate timing. As a result, rotation unevenness having a period that is equivalent to a quarter of the period of one rotation of the motor 6 may occur four times during one rotation of the motor 6. Meanwhile, it is certain that rotation unevenness having a period equivalent to an integral multiple of the number of poles of the magnetized portions for driving of the rotor magnet 302 (i.e., having the frequency equivalent to the integral multiple thereof) occurs.

<Block Diagram of Entire Hardware Configuration>

Figure 4A:
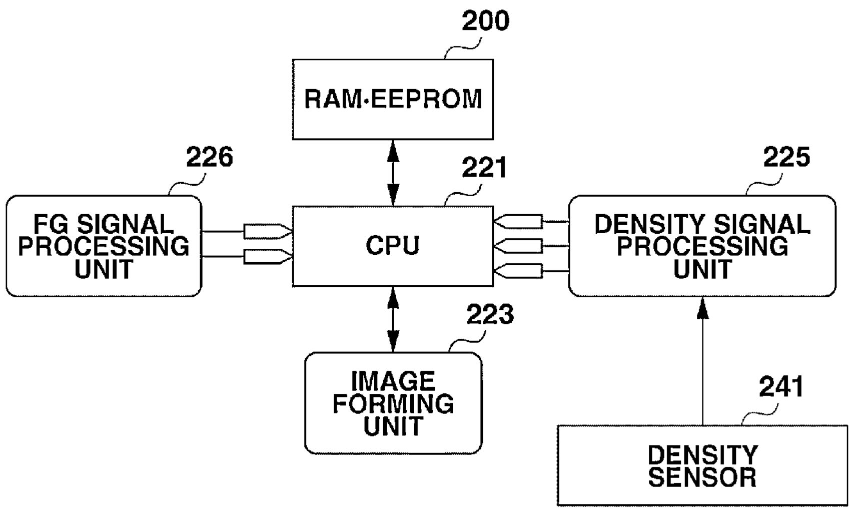
FIG. 4A is a block diagram illustrating an example of the entire system.

FIG. 4A is a block diagram illustrating an example of primary hardware configuration of the entire image forming apparatus according to the present exemplary embodiment. Referring to FIG. 4A, a density signal processing unit 225 (hereinafter simply referred to as a "signal processing unit 25") and an FG signal processing unit 226 include an application specific integrated circuit (ASIC) or system on chip (SOC).

The CPU 221 operates in cooperation with each block of the storage unit 200, the image forming unit 223, the FG signal processing unit 226, the signal processing unit 25, and the density sensor 241 to execute various control operations. In addition, the CPU 221 executes various calculation operations according to input information.

The storage unit 200 includes an electrically erasable programmable ROM (EEPROM) and a random access memory (RAM). The EEPROM stores a correspondence relation between a count value (equivalent to positional information about the motor) for identifying an FG signal (phase information about the motor 6) and correction information used by the scanner unit 24 for correcting the image density. The correspondence relation is rewritably stored on the EEPROM. In addition, the EEPROM stores various setting information used for controlling the image formation processing.

The RAM of the storage unit 200 temporarily stores information used by the CPU 221 to implement various processing. The image forming unit 223 collectively denotes parts related to image forming processing described above with reference to FIG. 1. The image forming unit 223 will not be described in detail again here. The density sensor 241 has the configuration described above with reference to FIGS. 2A and 2B.

The signal processing unit 25 inputs a signal of a result of the detection by the density sensor 241. In addition, the signal processing unit 25 supplies (outputs) the input signal after processing or without processing the input signal so that density unevenness occurring in the motor 6, which is target of the detection, can be easily extracted by the CPU 221.

On the other hand, the FG signal processing unit 226 inputs an FG signal output from the motor 6, which is described above with reference to FIGS. 3A through 3E, and executes processing relating to the FG signal. More specifically, the FG signal processing unit 226 processes the FG signal and outputs the processed FG signal to the CPU 221 so that the CPU 221 can identify and recognize the phase of the motor 6. In addition, the FG signal processing unit 226 notifies a result of determination executed during the processing on the FG signal to the CPU 221.

In the image forming apparatus according to the present exemplary embodiment having the above-described configuration, the CPU 221 generates a table, which stores correspondence relation between the rotational phase of the motor and the correction information used for correcting the density (correcting banding) based on a density signal output from the signal processing unit 25 and a phase signal output from the FG signal processing unit 226.

In addition, the CPU 221 causes the scanner unit 24 to execute exposure by applying correction of the density according to the phase of the rotation unevenness of the motor 6 in synchronization with the variation of the phase of the motor 6, which is identified according to the FG signal supplied from the FG signal processing unit 226. The exposure processing will be described in detail below with reference to a corresponding flow chart and drawings.

<Detailed Block Diagram of Signal Processing Unit 25>

Figure 4B:
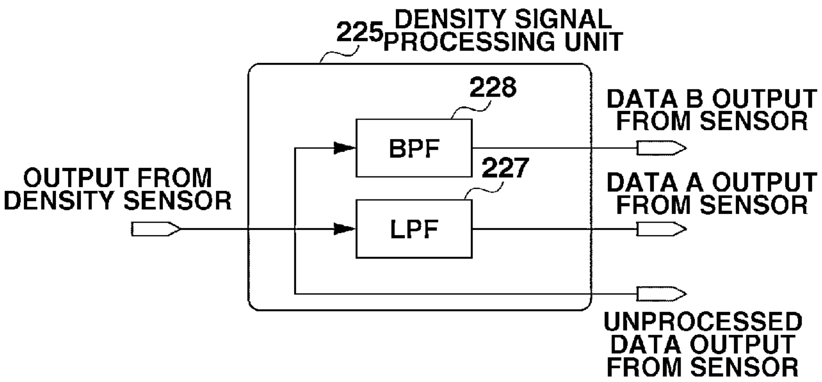
FIG. 4B is a block diagram illustrating an example of a density signal processing unit.
Figure 5A:
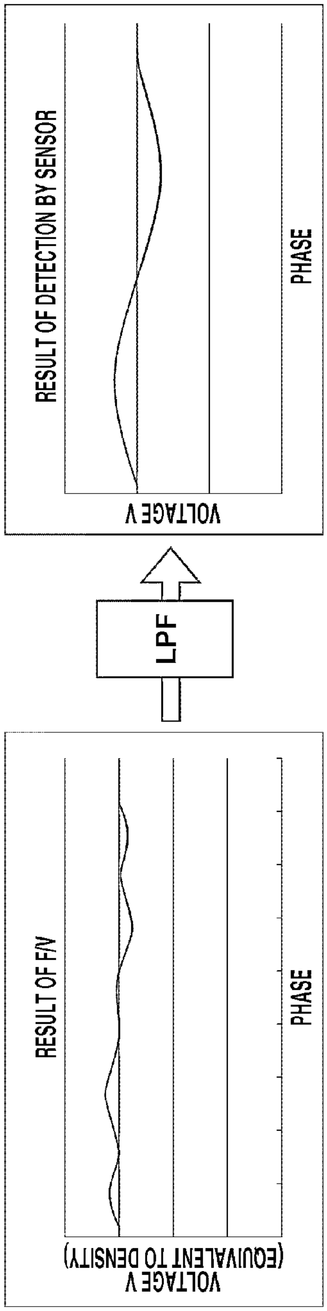
FIGS. 5A and 5B illustrate an example of an operation characteristic of a low-pass filter (LPF) and a band pass filter (BPF).

Now, the signal processing unit 25, which has the configuration described above with reference to FIG. 4A, will be further described in detail with reference to FIG. 4B. Referring to FIG. 4B, a low-pass filter (LPF) 227 allows a signal having a component of a specific frequency to selectively pass therethrough. By using a cutoff frequency of the filter, the LPF 227 primarily allows a signal having a component of frequency below a component of frequency having one period during one rotation of the motor (hereinafter simply referred to as a "component W1") to pass therethrough. In addition, the LPF 227 attenuates a signal different from the above-described signal, which is a signal of a frequency equivalent to an integral multiple of the component W1. FIG. 5A illustrates an example of an operation of the LPF 227. By inputting an output from the density sensor and allowing the same to pass through the LPF 227, the CPU 221 is enabled to easily extract density unevenness of the component W1.

Figure 5B:
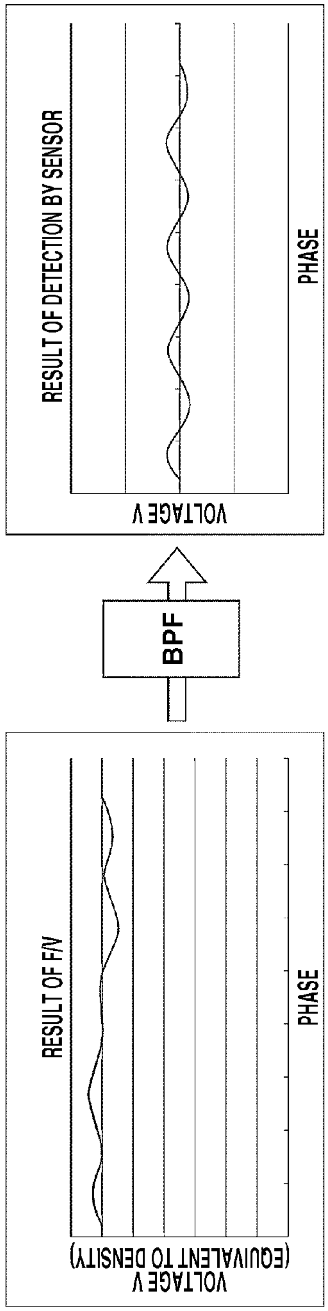

A band pass filter (BPF) 228 is capable of extracting a component of a predetermined frequency, of outputs of the density sensor 241. In the present exemplary embodiment, the BPF 228 extracts rotation unevenness of a frequency component having a frequency that is equivalent to four times integral multiple of the frequency of one rotation of the motor (i.e., a quarter period: hereinafter referred to as a "component W4"). For the filter characteristic, the BPF 228 uses two cutoff frequencies around the frequency of the component W4. FIG. 5B illustrates an example of an operation of the BPF 228. By inputting an output from the density sensor and allowing the same to pass through the BPF 228, the CPU 221 is enabled to easily extract density unevenness of the component W4.

In addition, the signal processing unit 25 supplies unprocessed sensor output data to the CPU 221. In the present exemplary embodiment, "unprocessed sensor output data" refers to data obtained based on a result of the detection by the density sensor 241 without removing a component of motor rotation unevenness therefrom. The unprocessed sensor output data is utilized by the CPU 221 in calculating an average detection value detected by the density sensor 241.

As will be described in detail later below, the CPU 221 calculates a correction value for correcting density unevenness of both of the components W1 and W4, which may occur due to the rotation unevenness of the motor. In addition, the CPU 221 associates the calculated correction value with the count value of the FG signal, which is phase information. Furthermore, the CPU 221 stores the correction value and the FG signal count value on the storage unit 200 so that the stored values can be utilized according to the phase of rotation of the motor 6 during image formation (exposure).

In the present exemplary embodiment, the "phase of rotation unevenness of the motor 6" can be detected according to a specific state of periodic variation of the rotation speed of the motor 6. Furthermore, in the present exemplary embodiment, "variation of the phase of the rotation unevenness of the motor 6" refers to variation of the rotational speed of the motor 6 from the above-described specific state (speed) of rotation.

<Detailed Block Diagram of FG Signal Processing Unit 226>

Now, of the FG signal processing unit 226, which has the hardware configuration illustrated in FIG. 4A, will be described in further detail below with reference to FIG. 4C.

Figure 4C:
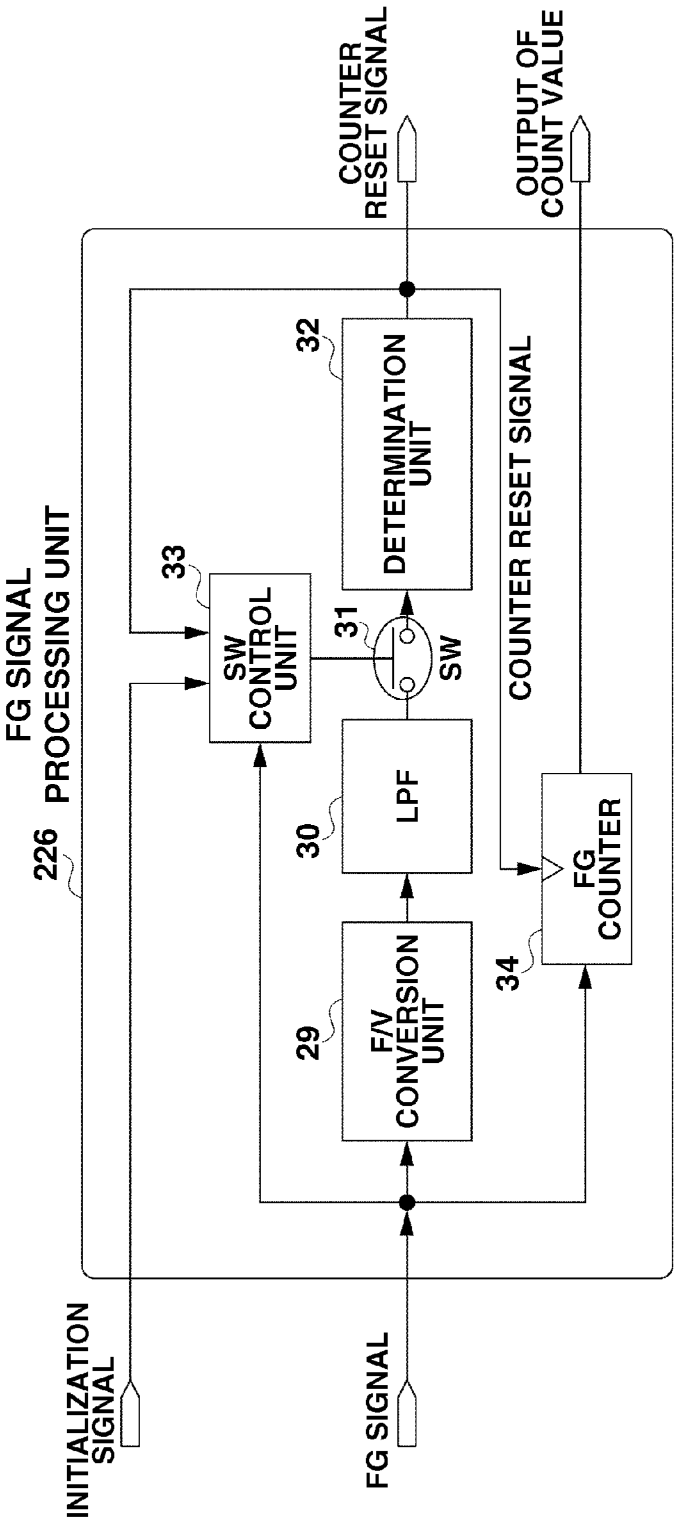
FIG. 4C is a block diagram illustrating an example of a frequency generator (FG) signal processing unit.

Referring to FIG. 4C, a frequency-to-voltage (F/V) conversion device 29 analyzes the frequency of the acquired FG signal. More specifically, the F/V conversion device 29 measures the period of a pulse of the FG signal and outputs voltage of a level corresponding to the measured period. For a cutoff frequency of the filter of a LPF 30, components having a frequency equivalent to and below the frequency of the component W1 are allowed to pass through the LPF 30. On the other hand, the LPF 30 attenuates components having the frequency above the frequency of the component W1. It is also useful if a fast Fourier transform (FFT) analysis unit is provided instead of the F/V conversion device 29 and the LPF 30. In this case, the FFT analysis unit analyzes the frequency of an FG signal.

A switch (SW) 31 is a switch for switching whether to input a signal output from the LPF 30 into a determination unit 32. An SW control unit 33 switches on the SW 31 by using an initialization signal. After counter resetting processing ends, the SW control unit 33 switches off the SW 31 by using an FG counter signal, which is input next.

The determination unit 32 acquires the signals input from the LPF 30 corresponding to one rotation of the motor 6 and calculates an average value thereof. After calculating the average value, the determination unit 32 compares the values input from the LPF 30 and the average value thereof. If it is determined that the result of the comparison satisfies a predetermined condition, the determination unit 32 outputs a counter reset signal. A counter reset signal is input to the SW control unit 33 and an FG counter 34. Furthermore, the counter reset signal is transmitted to the CPU 221 to notify the CPU 221 that the counter has been reset.

The FG counter 34 counts up the number of FG pulses corresponding to one rotation of the motor 6 and toggles the counter 34. In the present exemplary embodiment, when the motor rotates once, FG signals of 32 pulses are output. Accordingly, the FG counter 34 counts from "0" to "31". When a counter reset signal is input, the FG counter 34 resets the count value to "0".

<Hardware Configuration and Functional Block Diagram>

Figure 6A:
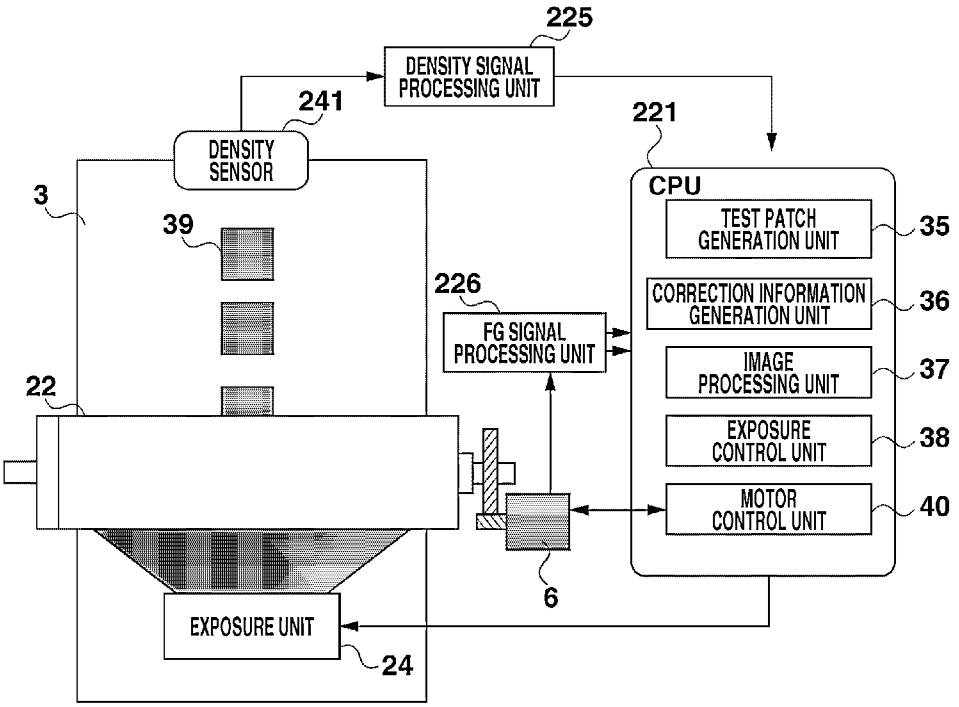
FIGS. 6A and 6B is a block diagram illustrating an exemplary functional configuration of the system.

FIG. 6A illustrates an example of relationship among parts of the color image forming apparatus, components illustrated in block diagrams in FIGS. 4A through 4C, and functional units controlled by the CPU 221. Components, units, or members illustrated in FIG. 6A that are the same as those illustrated in FIG. 1 and FIGS. 4A through 4C are provided with the same reference numerals and symbols. Accordingly, the description thereof will not be repeated here.

Referring to FIG. 6A, a test patch generation unit 35 includes a function for forming a detection pattern 39 used for detecting density (the detection pattern 39 is hereinafter referred to as a "test patch 39"), which includes a toner image, on the intermediate transfer member 27. In addition, the test patch generation unit 35 causes the exposure unit (scanner unit) 24 to form an electrostatic latent image on the photosensitive drum 22 based on data included in the test patch.

In addition, the test patch generation unit 35 executes control for forming a toner image on the intermediate transfer member 27 based on the electrostatic latent image formed by a development unit (not illustrated). Furthermore, the density sensor 241 irradiates a test patch 39 formed in the above-described manner with light. In addition, the density sensor 241 detects a characteristic of light reflected from the test patch 39. Furthermore, the density sensor 241 inputs a result of detection of the characteristic of the light reflected from the test patch 39 to the signal processing unit 25.

A correction information generation unit 36 generates density correction information based on the result of detection of the test patch 39, which is executed by the density sensor 241. The density correction information will be described in detail later below with reference to FIGS. 11A through 11C.

The image processing unit 37 executes image processing, such as halftone processing, on various images. An exposure control unit 38 causes the exposure unit 24 to execute exposure in synchronization with and according to the FG count value. After executing electrophotographic processing on the image, a test patch is formed on the intermediate transfer member 27.

Figure 6B:
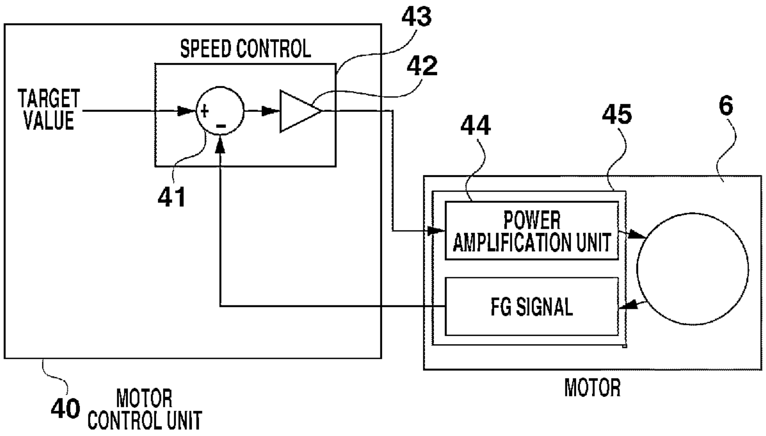

FIG. 6B illustrates an example of a motor control unit 40. Referring to FIG. 6B, a speed control unit 43 executes control of the rotation speed of the motor 6 at a predetermined speed. More specifically, the speed control unit 43 multiplies a control gain 42 with a value calculated by a difference calculation unit 41. The difference calculation unit 41 calculates a difference between a motor rotation speed target value and information about the rotation speed acquired from the FG signal of the motor 6. Furthermore, the speed control unit 43 outputs a result of the multiplication as a control amount.

More specifically, in the present exemplary embodiment, if the speed included in the information about the rotation speed of the motor 6 is lower than the target value, then the motor control unit 40 increases the control amount. On the other hand, if the speed included in the information about the rotation speed of the motor 6 is higher than the target value, then the motor control unit 40 decreases the control amount. In the above-described manner, the motor control unit 40 controls the rotation speed of the motor 6 to match the target value. In addition, the motor control unit 40 can change and set the control gain of the motor 6.

A motor control integrated circuit (IC) 45 determines the amount of power to be supplied to the motor 6 by a power amplification unit 44 according to the control amount input by the motor control unit 40.

The relationship between the hardware configuration and the functional blocks described above with reference to FIGS. 4A through 4C, and FIGS. 6A and 6B are mere examples, and the present invention is not limited to this. More specifically, it is also useful if a part of or the entire function of the CPU 221, which is described with reference to FIG. 4 and FIGS. 6A and 6B, is implemented by the Application Specific Integrated Circuits (ASIC). On the other hand, it is also useful if a part of or the entire function of the ASIC, which is described with reference to FIG. 4 and FIGS. 6A and 6B, is implemented by the CPU 221.

<Flow Chart of Processing for Generating Exposure Output Correction Table>

Figure 7:
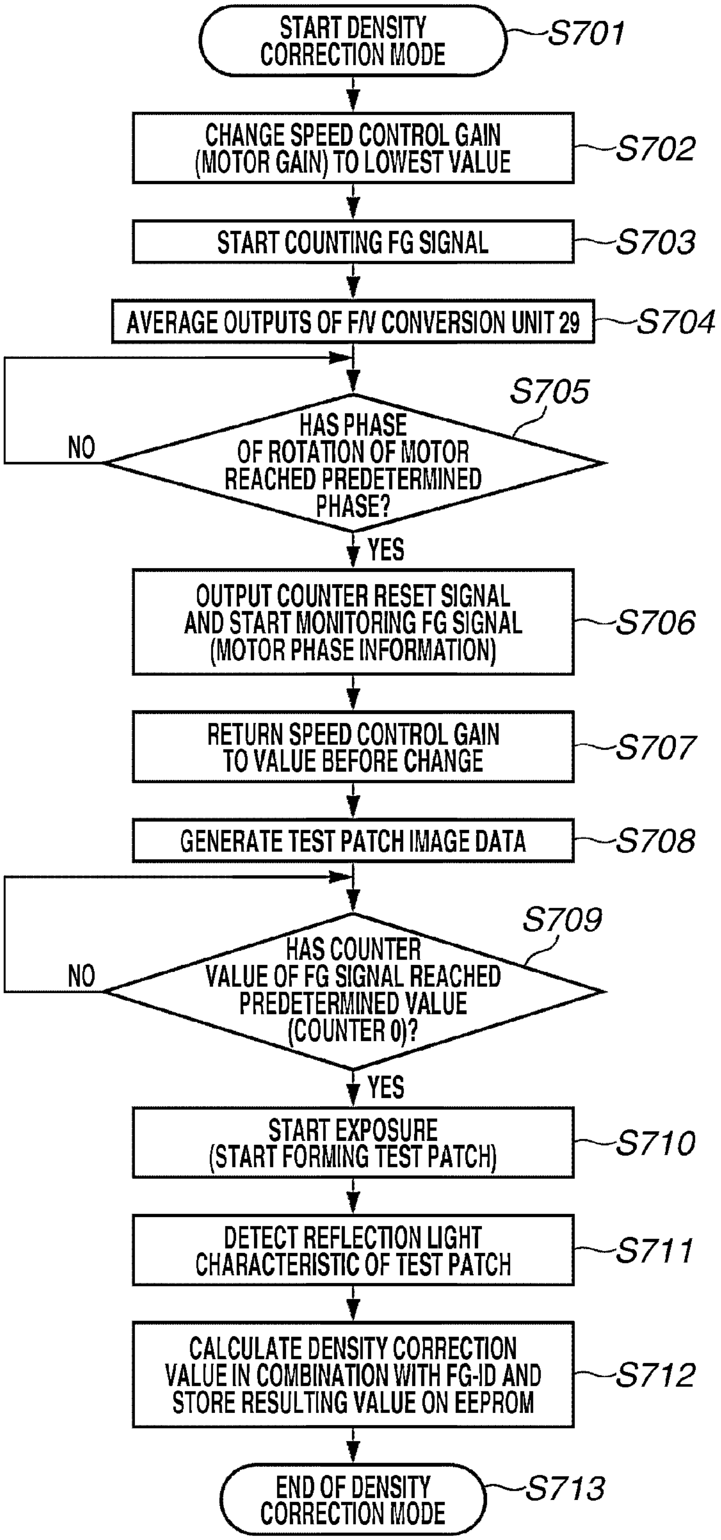
FIG. 7 is a flow chart illustrating an example of exposure output correction table generation processing.
Figure 8:
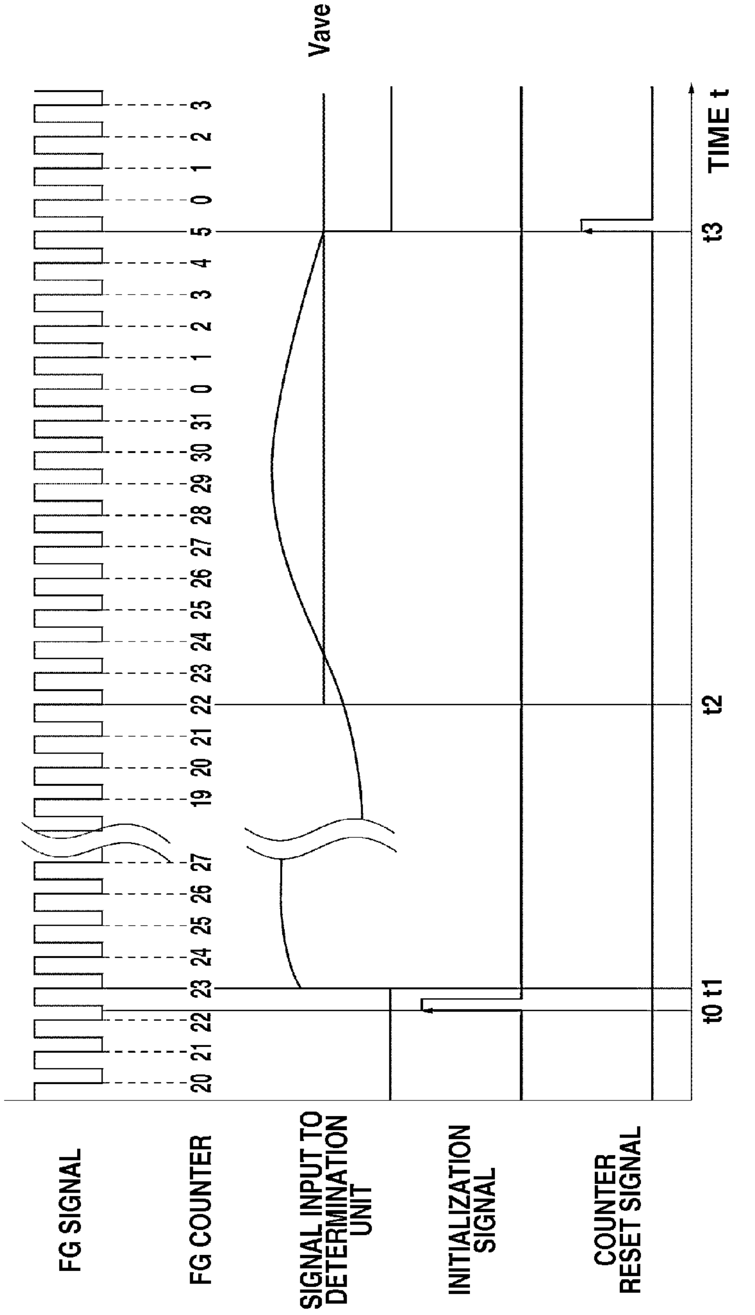
FIG. 8 is a timing chart illustrating an example of processing for resetting a counter value of an FG signal.

FIG. 7 is a flow chart illustrating an example of exposure output correction table generation processing. By executing the processing illustrated in the flow chart of FIG. 7, the present exemplary embodiment acquires the correspondence relation between motor phase information and density unevenness, calculates density correction information in relation to the density unevenness, and generates a table storing correspondence relation between motor phase information and density correction information. In executing printing after that, the table generated by executing the processing illustrated in the flow chart of FIG. 7 is used to reduce banding. Now, the exposure output correction table generation processing according to the present exemplary embodiment will be described in detail below.

Referring to FIG. 7, in step S701, an exposure output adjustment mode starts. In step S702, the motor control unit 40 verifies that the rotation speed of the motor 6 is in a predetermined range of rotation frequency. After it is verified that the rotation speed of the motor 6 is in the predetermined range of rotation frequency, the motor control unit 40 changes a setting of the control gain 42 of the speed control unit 43 to a lowest value.

However, the setting of the gain is not limited to the lowest value. More specifically, if the gain is set at a setting value lower than that at least in normal image formation processing, the rotation unevenness in the period of one rotation of the motor can increase, which may enable easy detection of the rotation unevenness. In the present exemplary embodiment, the "normal image formation processing" refers to processing for forming an image according to image information input by a computer external to an image forming apparatus, i.e., according to image information generated by a user by operating the computer.

In step S703, in order to detect the phase of rotation of the motor, the CPU 221 switches on the SW 31 by using the SW control unit 33. In addition, the CPU 221 executes control for starting counting of a motor FG signal.

In step S704, the determination unit 32 extracts an output of the F/V conversion device 29. More specifically, the determination unit 32 extracts rotation unevenness in the period of one rotation of the motor that has been processed by the LPF and averages the extracted rotation unevenness.

In step S705, the determination unit 32 determines whether the phase of the motor rotation unevenness having the component W1 has reached a predetermined phase. More specifically, in the present exemplary embodiment, the determination unit 32 determines whether the phase of the rotation unevenness of the motor 6 has reached a value "0". If it is determined that the phase of the motor rotation unevenness has reached the predetermined phase (YES in step S705), then the processing advances to step S706. In step S706, the CPU 221 inputs a counter reset signal to rest the FG counter 34.

In addition, in step S706, the CPU 221 starts monitoring the count value of the FG signal, which is motor phase information. The phase of the motor 6 is identified by executing counting of the FG signal. Furthermore, the monitoring of the count value of the FG signal is continued until a print job ends.

On the other hand, in step S707, the motor control unit 40 returns the setting of the control gain 42 from the lowest value to its original setting value. In the above-described manner, in forming a test patch, the same condition, i.e., the same setting value of the control gain 42, as that in the normal image formation processing can be set. In step S708, the test patch generation unit 35 generates test patch data for the patch 39.

In step S709, the test patch generation unit 35 determines whether the count value of the motor FG signal has reached a predetermined value ("0"). If it is determined that the count value of the motor FG signal has reached the predetermined value ("0") (YES in step S709), then the processing advances to step S710. In step S710, the CPU 221 executes control for starting exposure by using the exposure unit 24. In the present exemplary embodiment, in forming a test patch, the exposure output correction table is not used.

In step S711, the density sensor 241 detects reflection light reflected on the test patch formed on the intermediate transfer member 27. In the present exemplary embodiment, the result of the detection by the density sensor 241 is input to the CPU 221 via the signal processing unit 25. As described above with reference to FIG. 4B, three types of signals are input to the CPU 221.

In step S712, the correction information generation unit 36 calculates density correction information, which is used for reducing the density unevenness occurring due to the motor rotation unevenness according to the result of the detection in step S711. In addition, the correction information generation unit 36 stores the calculated density correction information on the EEPROM.

More specifically, the correction information generation unit 36 calculates a density average value (hereinafter referred to as "Dave") according to the result of the detection in step S711. In addition, the correction information generation unit 36 calculates a density value Dn in correspondence with each phase of rotation of the motor. Furthermore, the correction information generation unit 36 compares the density average value Dave with the density value Dn corresponding to each phase of rotation of motor (FG count value) to calculate the difference between them.

In addition, the correction information generation unit 36 calculates a correction value Dcn. More specifically, the correction information generation unit 36 executes the calculation of the correction value Dcn by using the following expression:

$$Dcn=\text{Dave}/Dn=\text{Dave}/(\text{Dave}+\text{difference value}).$$

Furthermore, the CPU 221 executes control for applying the correction value Dcn, which has been calculated in the above-described manner, to the density of the image information. Alternatively, the CPU 221 executes control for applying the correction value Dcn to a control signal for directly driving the exposure unit 24 instead of applying the same to the image information.

Let Dave=10 and Dn=10.5, where detected value of density is higher than an average value by approximately 5%. Then, Dave/Dn=10/10.5=10/(10+0.5)=0.952. In this case, if Dn=10.5, it is useful to multiply a signal for controlling the time or the intensity of exposure by the exposure unit 24 by 0.952.

In step S712, the CPU 221 associates the correction value calculated in the above-described manner with the FG count value, and stores the mutually associated correction value and FG count value. By executing the above-described processing also, the CPU 221 can execute exposure by using the exposure unit 24 by executing correction on the density according to the phase of the rotation unevenness of the motor.

In the processing in step S711, as described above with reference to FIG. 4B, the LPF 227 and the BPF 228 execute detection of the components W1 and W4. The timing for starting detection of reflection light having the component W4 is the same as that for the component W1.

In the processing in step S712, the correction information generation unit 36 calculates correction information for correcting the density unevenness in relation to each of the components W1 and W4 according to the detected density unevenness in relation to the components W1 and W4. After having executed the processing in each step described above, the processing advances to step S713. In step S713, the exposure output correction table generation processing ends.

<Processing for Associating Phase of Motor and Density Variation of Toner Image>

FIG. 8 is a timing chart of the processing in steps S702 through S706 illustrated in FIG. 7. More specifically, FIG. 8 is a timing chart illustrating an example of processing for resetting a counter value of a motor FG signal. By executing the processing illustrated in the timing chart of FIG. 8, it is possible to determine what state of variation of the rotation speed of the motor 6 is to be set as what phase (in the present exemplary embodiment, the phase "0" ($FG_0$).

In the example illustrated in FIG. 8, a state in which the rotation speed of the motor just goes beyond the average value, i.e., a state in which the rotation speed varies from a speed higher than the average value to a speed lower than the average value, is allocated as the phase "0" ($FG_0$). However, the example illustrated in FIG. 8 is a mere example. More specifically, it is also useful if an arbitrary or predetermined state of variation of rotation speed of the motor 6 is set as any phase (e.g., the phase "0" ($FG_0$)).

To paraphrase this, it is useful to allocate an arbitrary or predetermined state of variation of rotation speed of the motor 6 as any arbitrary or predetermined phase so that the allocated phase can be identified in the processing later. In the above-described manner, the CPU 221 can executes control for performing various processing by using the phase of the motor 6 as a parameter. The timing chart illustrated in FIG. 8 is an example thereof. Now, the processing will be described in detail below.

Referring to FIG. 8, at timing t0, the CPU 221 outputs an initialization signal to the FG signal processing unit 226. Then, the initialization signal is transmitted to the SW control unit 33. In step S703, the SW control unit 33 switches on the SW 31 in synchronization with the FG signal that has been input first after the timing t0.

During the time period from timing t1 and t2, i.e., during a time period corresponding to the input FG signals of one rotation of the motor, the determination unit 32 calculates an average value Vave, which is an average value of values input by the LPF 30. After the timing t2, the determination unit 32 compares the calculated average value Vave with the value input by the LPF 30. At timing t3 (YES in step S705), at which the input value goes beyond the average value Vave from a value higher than the average value to a value lower than the average value, the CPU 221 executes control for outputting a counter reset signal.

In step S706, after receiving the counter reset signal at the timing t3, the FG counter 34 resets the count value to "0". When the counter reset signal is received, the CPU 221 recognized that the initialization of the phase information (FG count value) has been completed. After the resetting of the counter, the CPU 221 continues the monitoring of the FG counter 34.

Figure 9A:
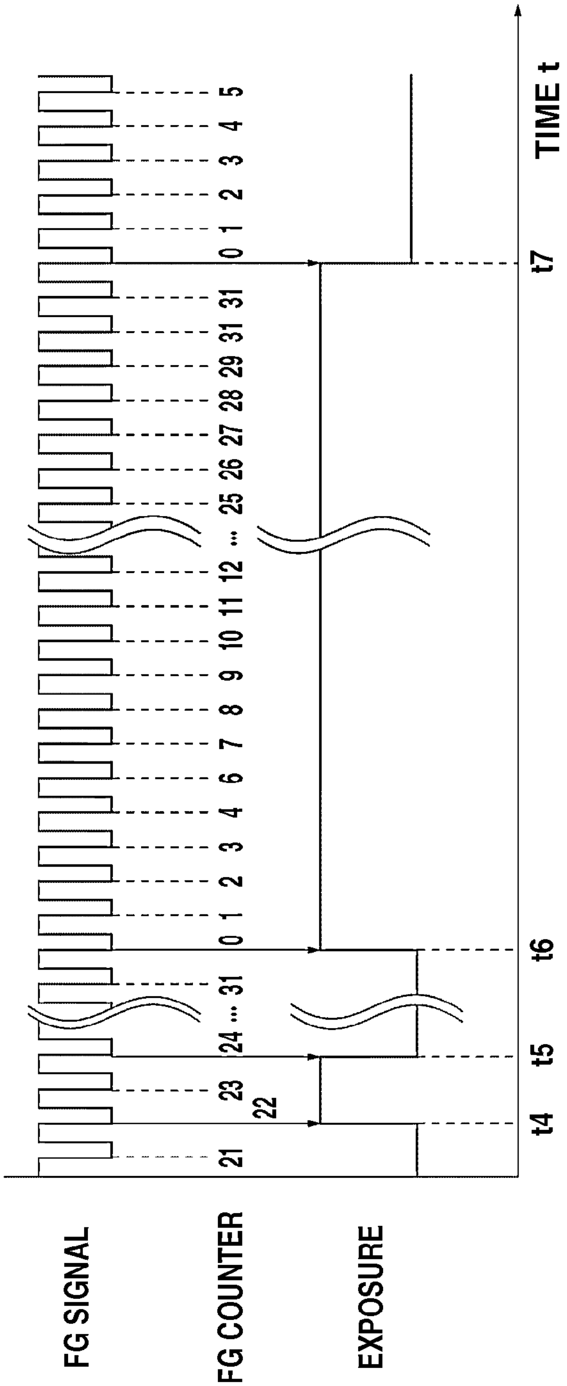
FIGS. 9A and 9B are timing charts illustrating an example of processing for forming (exposing) a test patch and reading the formed (exposed) test patch.

FIG. 9A is a timing chart of processing for exposing a toner image patch. More specifically, FIG. 9A is a timing chart illustrating detailed processing in step S708 in FIG. 7. In the timing chart illustrated in FIG. 9A, it is supposed that the counting of the FG signal has been continuously executed from the timing at which the processing illustrated in FIG. 8 is executed. More specifically, it is premised that the phase of rotation unevenness of the motor 6 has been continuously identified as the FG count value varies. Now, the processing illustrated in the timing chart of FIG. 9A will be described in detail below.

To begin with, a test patch according to the present exemplary embodiment will be defined in detail. In the present exemplary embodiment, a test patch includes a prepatch, which is used in generating a timing of reading, and a normal patch, which is used in measuring density unevenness. At timing t4, which is a timing before the counter value reaches a predetermined FG count value, with which exposure of a normal patch is to be started, the test patch generation unit 35 starts forming (exposure) of a prepatch. In the present exemplary embodiment, the timing t4 is a timing earlier than the exposure of the normal patch by ten FG counts.

Furthermore, a prepatch is a patch used for synchronizing the timing for starting detection of a test patch by the density sensor 241. The length (the dimension in the longitudinal direction) of the test patch may not need to be long. More specifically, the test patch does not need to have a length equivalent to the dimension of one rotation of the motor. It is sufficient that the test patch has a length enough to be detected by the density sensor 241. In the example illustrated in FIG. 9A, the exposure time for exposing a prepatch is set at a time period equivalent to two FG counts. More specifically, the CPU 221 stops the exposure of the prepatch at timing t5.

At timing t6, if the predetermined FG count value has reached "0" (YES in step S709), the test patch generation unit 35 starts exposure of a normal patch. In step S710, the exposure is continued until FG counting for at least one rotation of the motor is completed. After executing electrophotographic processing described above with reference to FIG. 1, a test patch (toner image) is finally formed on the intermediate transfer member 27.

Figure 9B:
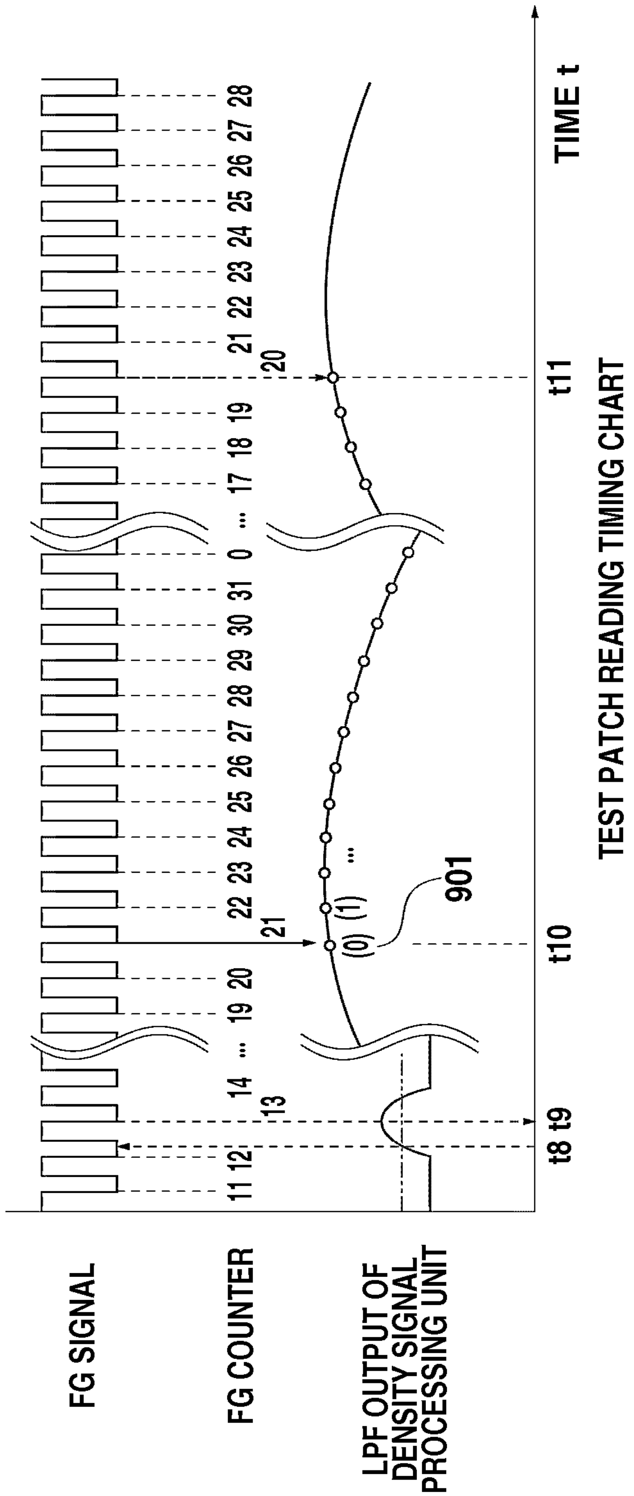

FIG. 9B is a timing chart illustrating an example of timing for reading a test patch. More specifically, FIG. 9B illustrates the processing in step S711 of FIG. 7 in detail.

In the example illustrated in FIG. 9A described above, the test patch generation unit 35 starts exposure of the test patch after counting ten FG counts from the start of exposure of the prepatch. Accordingly, the reading of a test patch is started after (10+32n (n is an integer equal to or greater than 0)) counts have elapsed since the prepatch is detected by the density sensor 241.

At timing t8, the density sensor 241 detects the prepatch. At timing t10, which is timing after (10+32n (n is an integer equal to or greater than 0)) counts has elapsed since timing t9, at which a next FG pulse is detected, the reading of a patch is started. A threshold value for determining whether a prepatch has been detected at the timing t8 may be appropriately set according to the density of the patch or the amplitude of the density unevenness that may occur.

An FG signal 901, which is phase information about the motor 6, is managed by the CPU 221. More specifically, the FG signal 901 is an FG signal that has been recognized by the CPU 221 when the normal test patch whose optical performance is read is exposed. The state of the phase information about the motor 6 will be described in detail below with reference to FIGS. 10A through 10C.

Figure 10A:
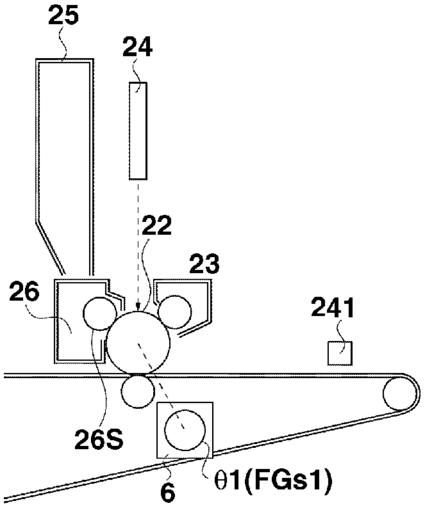
FIGS. 10A through 10C illustrate an example of relationship between a rotational unevenness phase and an exposure timing of a motor.
Figure 10B:
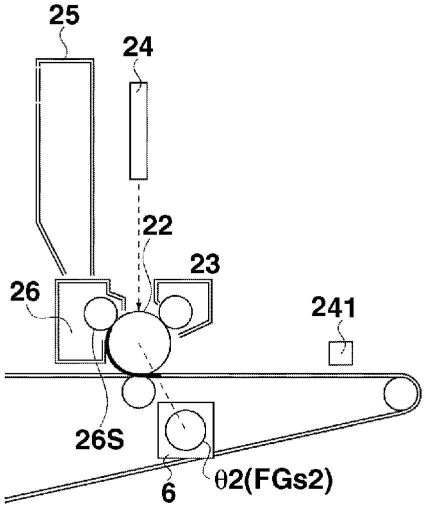
Figure 10C:
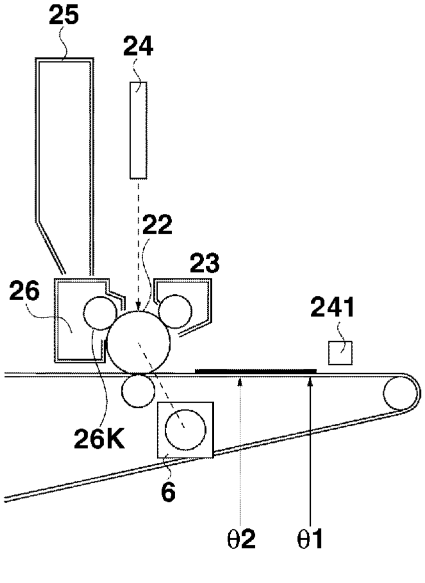

FIGS. 10A through 10C illustrate an example of relationship between the timing of exposure executed by the exposure unit 24 and the phase information about the motor 6 that has been recognized by the CPU 221 at the exposure timing. More specifically, FIGS. 10A and 10B illustrate a state in which the CPU 221 has already recognized the phase information about the motor 6 before forming an electrostatic latent image of the test patch. In the example illustrated in FIGS. 10A and 10B, FG signals FGs1 and FGs2 correspond to phases θ1 and θ2, respectively. FIG. 10C illustrates which phase information about the motor 6 corresponds to which location of the formed test patch in the direction of moving of the test patch at the time of exposure of the image. The correspondence relation illustrated in FIG. 10C is managed by the CPU 221.

Although not illustrated in FIG. 9B, it is supposed that in actual processing, a detected optical characteristic of the component W4 has been output from the BPF in synchronization with the timing t10, and is then input to the CPU 221. The optical characteristic of the test patch detected by the density sensor 241 is input to the CPU 221 after being processed by the LPF 227 and the BPF 228 of the signal processing unit 25.

The CPU 221 associates the optical characteristic value (equivalent to the density value) output from the signal processing unit 25 with the phase information (FG count value) about the motor 6 at the time of forming the detection target pattern and stores the mutually associated optical characteristic value and motor phase information on the EEPROM. When the timing reaches the timing t11 and a result of the detection by the density sensor 241 corresponding to the FG count for at least one rotation of the motor 6 is acquired, the CPU 221 ends the processing for reading the test patch.

For the reading of the optical characteristic executed by the density sensor 241, which is described with reference to the timing chart of FIG. 9B, the CPU 221 may read the optical characteristic around outline circle points in the example illustrated in FIG. 9B for a plurality of number of times and uses the optical characteristic values read by using the density sensor 241.

In the present exemplary embodiment, the value detected by the density sensor 241 and input to the CPU 221 at the timing t10 has already been processed by the LPF 227. Therefore, the accuracy of the detected value that is input to the CPU 221 may not be high enough according to the frequency characteristic of the LPF 227. In this case, in order to improve the accuracy of the detection executed by the density sensor 241, it is useful to use a detected value corresponding to an FG count value acquired as a thirty-second FG count value (for the component W4, an eighth FG count value) after the timing t10 instead of the above-described detected value.

<Density Unevenness Component of Test Patch>

In the present exemplary embodiment, as can be understood by referring to the examples illustrated in FIGS. 10A through 10C, a result of the detection of a test patch is affected by the rotation unevenness of the motor 6 that has occurred during exposure. In addition, a result of the detection of a test patch is also affected by the rotation unevenness of the motor 6 that has occurred during transfer. More specifically, the rotation unevenness occurs from the same source at the time of both exposure and transfer. Furthermore, density unevenness including integrated affect described above is detected from a test patch. Density unevenness is caused by the physical shape of the motor. Accordingly, the phase of the rotation unevenness in the period of one rotation of the motor is repeatable in correspondence with the physical state of the motor.

<Example of Exposure Output Correction Table>

FIGS. 11A through 11C illustrate an example of an exposure output correction table generated by executing the processing in step S711 of the flow chart of FIG. 7. Information illustrated in FIGS. 11A through 11C is stored on the EEPROM. During image forming, the CPU 221 refers to the exposure output correction table to execute correction of banding according to the phase of the rotation unevenness of the motor (density correction by controlling the exposure).

A table A illustrated in FIGS. 11A to 11C stores correspondence relation between the phase of the motor and the density value of a toner image. In FIGS. 11A to 11C, the table A is provided in each of the components W1 and W4. For the component W1, a voltage value V1, which is detected via the LPF 227, is converted into a density value. In this manner, the density value illustrated in FIG. 11A can be calculated.

For the component W4, the density value illustrated in FIG. 11B can be calculated by converting a result of the detection acquired via the BPF 228 into a density value and adding an average density value to the density value calculated by the conversion. The average density value may be calculated based on the result of detection in relation to the component W1. Alternatively, the average density value may be calculated by averaging unprocessed data output from the sensor illustrated in FIG. 4B by using the correction information generation unit 36.

Subsequently, the correction information generation unit 36 calculates the difference values Δd1 and Δd2 between each density value and each average density value for each of the components W1 and W4. In addition, the correction information generation unit 36 associates the calculated difference values Δd1 and Δd2 with each phase information to generate a table B.

Furthermore, the correction information generation unit 36 adds the density values Δd1 and Δd2 corresponding to each phase information stored in the table B. Furthermore, the correction information generation unit 36 calculates a total sum of the difference values for the components W1 and W4. A table C illustrated in FIG. 11C stores the total difference value calculated in the above-described manner.

The correction information generation unit 36 calculates a density correction value according to the combined difference value, which corresponds to each phase information. Let Dn be a density value of FGn at a specific phase of the motor 6 and Dave be an average characteristic. Then, the density correction value Dcn can be calculated by the following expression:

$$Dcn = Dave/(Dave + \text{total difference value}).$$

It is useful to multiply an exposure output by the density correction value calculated in the above-described manner. If the exposure output and the density are not proportional to each other, it is useful to appropriately associate a value calculated by multiplication, which corresponds to the amount of variation of the density, with each phase information.

The CPU 221 stores the information calculated in the above-described manner, which is stored in a table D (FIG. 11C), on the EEPROM so that the information can be utilized later. A smoother correction pattern can be generated by adding data that has been subjected to interpolation between FG signals to the density correction value Dcn. As described above, the present exemplary embodiment is useful in a case where rotation unevenness having a plurality of periods (frequency values) occurs from the same rotational member of the motor 6 and the rotation unevenness increases banding. With the above-described configuration, the present exemplary embodiment can effectively suppress the variation of density with a high accuracy.

In the present exemplary embodiment, in the exposure output correction table, the phases "0" of the phase of the density unevenness (corresponding to the phase of rotation unevenness of the motor) matches each other in relation to the components W1 and W4. However, the present exemplary embodiment is not limited to this. More specifically, the phases "0" of the phase of the density unevenness in relation to the components W1 and W4 may not match each other according to a mechanical configuration uniquely employed to the motor. In this case also, the present exemplary embodiment apparently can generate the exposure output correction table illustrated in FIGS. 11A through 11C in the above-described manner.

<Flow Chart of Image Data Correction Processing>

Figure 12A:
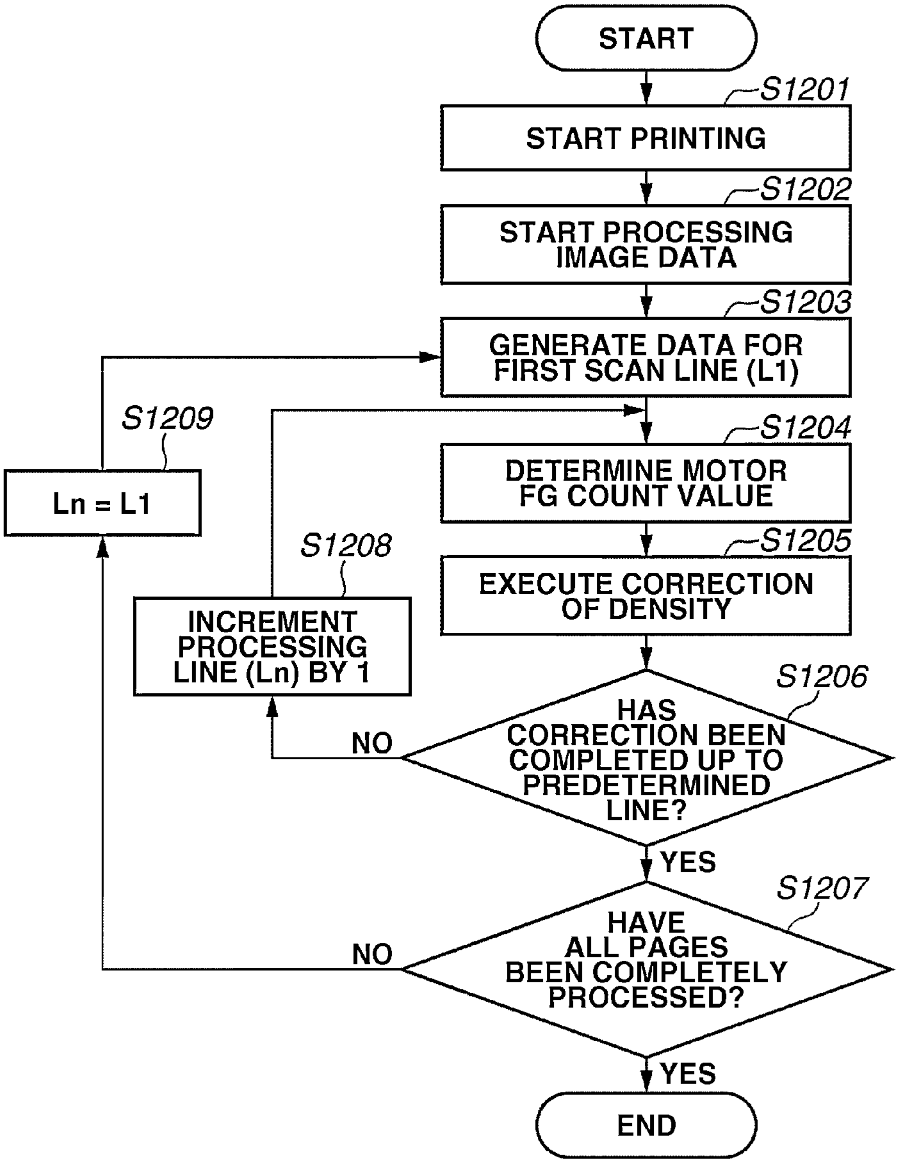
FIGS. 12A and 12B are flowcharts illustrating an example of image data correction processing and exposure processing.
Figure 12B:
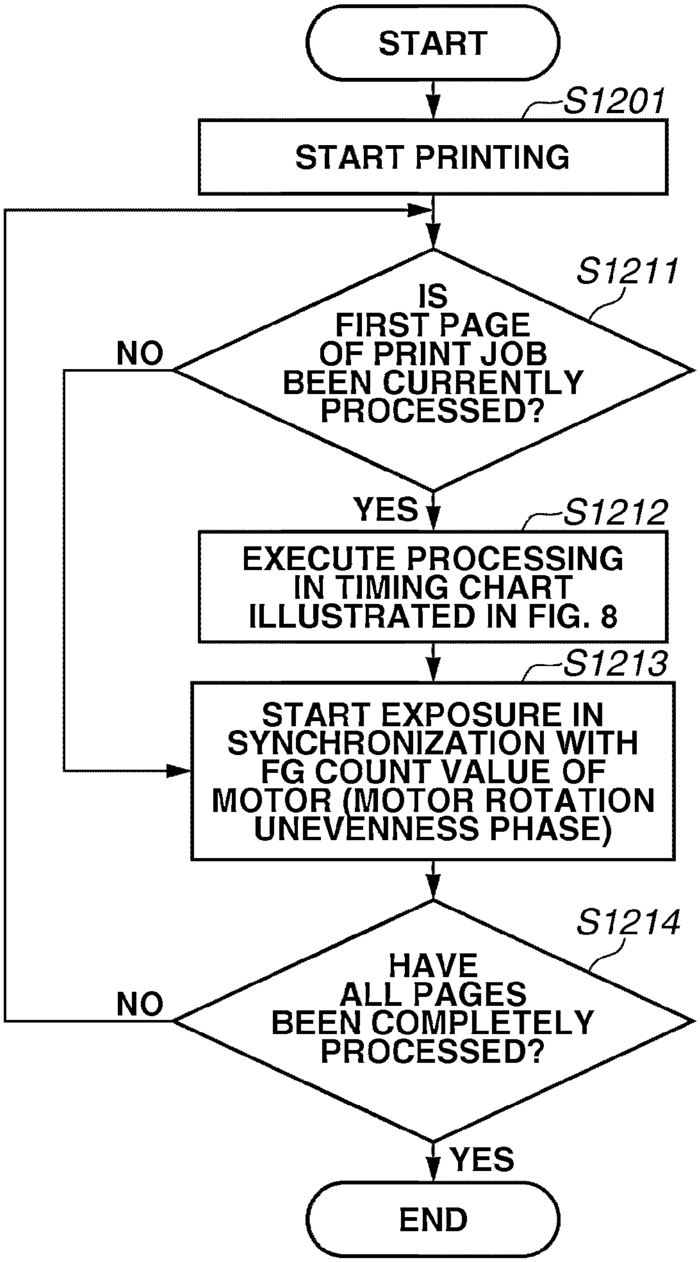

FIG. 12A is a flowchart illustrating an example of image data correction processing executed according to the phase of rotation unevenness of the motor. FIG. 12B is a flow chart illustrating an example of exposure processing. By executing the processing illustrated in the flow charts of FIGS. 12A and 12B, the present exemplary embodiment corrects banding of an image by using the density correction information, which is stored in the correction tables illustrated in FIGS. 11A through 1C, according to the phase of rotation unevenness of the motor 6.

Now, the exemplary image data correction processing will be described in detail below with reference to FIG. 12A. Referring to FIG. 12A, in step S1201, the CPU 221 starts the image formation processing (print processing). In step S1202, the image processing unit 37 starts processing of the image data on each scan line. In addition, by executing the following processing, the CPU 221 executes control for performing exposure processing, which includes exposure of n scan lines for one page, by the number of times equivalent to the number of pages included in the print job.

In step S1203, the image processing unit 37 reads image data on a first scan line L1. In step S1204, in order to determine the density correction value at a density DL1 on the first scan line L1, the image processing unit 37 determines the phase of the motor 6 (an FG count value FGs) on the scan line that is a target of the current processing.

Figure 13:
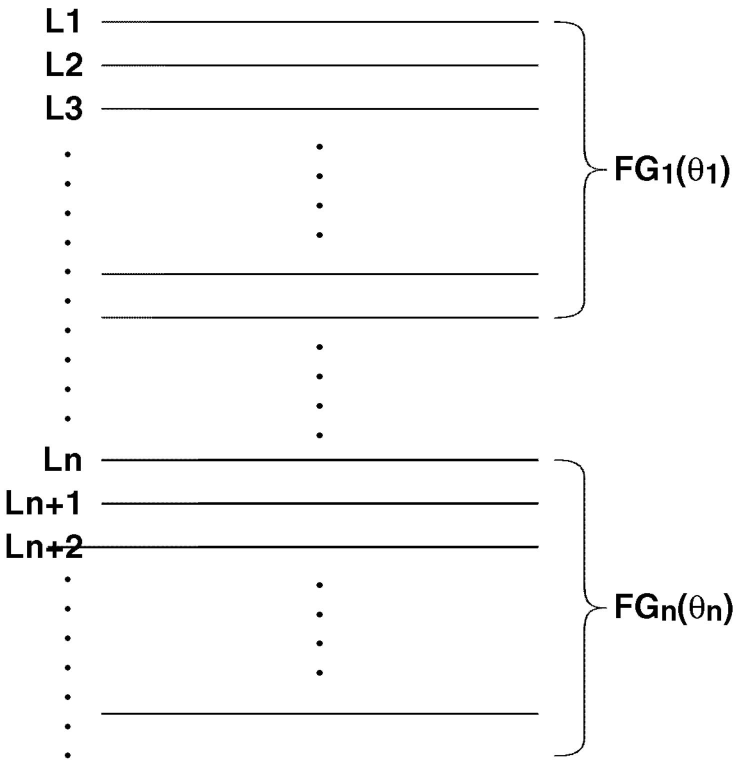
FIG. 13 illustrates an example of a correspondence relation between the phase of motor rotation unevenness phases and a plurality of scan lines.

In the present exemplary embodiment, thirty-two FG pulse signals are output during one rotation of the motor 6. Therefore, the motor rotates by 11.25 degrees for one FG signal. More specifically, the present exemplary embodiment sets the same phase (FG count value) on a plurality of scan lines that is currently scanned at every rotation of the motor 6 by 11.25 degrees. FIG. 13 illustrates an example of a relationship between the phase of the motor 6 and the plurality of scan lines.

In step S1205, the image processing unit 37 reads corresponding density correction information from the exposure output correction table (FIGS. 11A through 11C) according to a determined FG count value FGs, and multiplies a gradation value included in the image information by the read density correction information. Alternatively, the image processing unit 37 multiplies a signal for controlling the exposure density, the exposure time, and the exposure intensity by the read density correction information. In the above-described manner, the present exemplary embodiment corrects the density (banding).

In actual processing, if it is determined "NO" in step S1206, the present exemplary embodiment allocates each phase of rotation unevenness of the motor 6 to the image on each line in the sub scanning direction. Thus, the present exemplary embodiment executes the image processing according to the phase (FGs), which is associated with each line image.

In step S1206, the CPU 221 determines whether the processing has been completed for a predetermined scan line (the last scan line of a page). If it is determined that the processing has not been completed yet for the predetermined scan line (NO in step S1206), then the processing advances to step S1208. In step S1208, the image processing unit 37 increments a processing line number Ln by 1. Subsequently, the image processing unit 37 executes the processing in steps S1204 and S1205 on a next scan line.

On the other hand, if it is determined that the processing has been completed for the predetermined scan line (YES in step S1206), then the processing advances to step S1207. In step S1207, the CPU 221 determines whether the processing has been completed for all the pages. If it is determined that the processing has not been completed for all the pages yet (NO in step S1207), then the processing advances to step S1209. In step S1209, the CPU 221 executes the processing in step S1203 on a next page. On the other hand, if it is determined that the processing has been completed for all the pages (YES in step S1207), then the processing illustrated in the flow chart of FIG. 12A ends.

Now, the processing illustrated in the flow chart of FIG. 12B will be described in detail below. The processing illustrated in the flowchart of FIG. 12B starts in interlock with the processing in step S1201 illustrated in FIG. 12A.

Referring to FIG. 12B, in step S1211, the CPU 221 determines whether the first page of the print job is the target of the current processing. If it is determined that the first page of the print job is the target of the current processing (YES in step S1211), then the processing advances to step S1212. In step S1212, the CPU 221 executes the processing for resetting the FG count value of the motor, which is described above with reference to the timing chart of FIG. 8.

By executing the reset processing, the present exemplary embodiment can reproduce the correspondence of the phase of the motor 6 with the state of variation of the rotation speed of the motor 6 at a specific timing, which has been determined by executing the processing illustrated in the timing chart of FIG. 8. In the subsequent processing, the CPU 221 identifies (monitors) the variation of the phase of the motor by using the FG count value as a parameter. By executing the above-described processing, in subsequent step, the present exemplary embodiment can execute the exposure for cancelling the rotation unevenness of the motor 6 by using the scanner unit 24 in synchronization with the identified variation of the rotation unevenness of the motor 6.

In step S1213, the CPU 221 identifies the variation of the phase of the rotation unevenness of the motor 6. If it is detected that the phase of rotation unevenness of the motor 6 has reached a predetermined FG count value FGs, then the CPU 221 starts the exposure by using the scanner unit 24 in synchronization therewith and executes image forming.

In the present exemplary embodiment, the "predetermined FG count value FGs", which is determined in step S1213, refers to the phase of the motor 6 allocated on the first scan line in step S1204. By executing the processing in step S1213, the CPU 221 executes the exposure including density correction according to the phase of rotation unevenness of the motor by using the scanner unit 24.

During the processing in step S1213, i.e., while the scanning with a laser beam is repeatedly executed, the phase of rotation unevenness of the motor 6 varies. However, the present exemplary embodiment has already executed the density correction processing in steps S1203 through S1205 according to the variation of each phase (FG count value) of rotation unevenness of the motor 6. Accordingly, even if the phase of the rotation unevenness of the motor 6 has varied, the present exemplary embodiment can automatically suppress banding within the page.

In step S1214, the CPU 221 determines whether the processing has been completed for all the pages. If it is determined that the processing has been completed for all the pages (YES in step S1214), then the processing illustrated in the flow chart of FIG. 12B ends.

In the example illustrated in FIGS. 12A and 12B, the phase of rotation unevenness of the motor on a specific scan line is previously determined. Furthermore, the CPU 221 executes the exposure if it is detected that the phase of the rotation unevenness has reached the predetermined motor rotation unevenness phase. In executing monochromatic printing, the above-described configuration is useful. However, the present exemplary embodiment is not limited to this in executing full color printing. More specifically, the following modification can be employed. In this case, it is also useful if the scanner unit 24 is controlled to scan a scan line Ln with a laser beam at an arbitrary timing. Furthermore, in this case, it is also useful if the density of an image is corrected according to the phase of rotation of the motor during the exposure.

As described above, it is also useful if the CPU 221 executes control of the scanner unit 24 for executing the exposure including correction of density according to the phase of rotation unevenness of the motor in synchronization with the identified variation of the phase of the rotation unevenness. With the above-described configuration, the present exemplary embodiment can implement the exposure control with a high freedom degree. Now, the processing will be described in detail below.

Figure 14A:
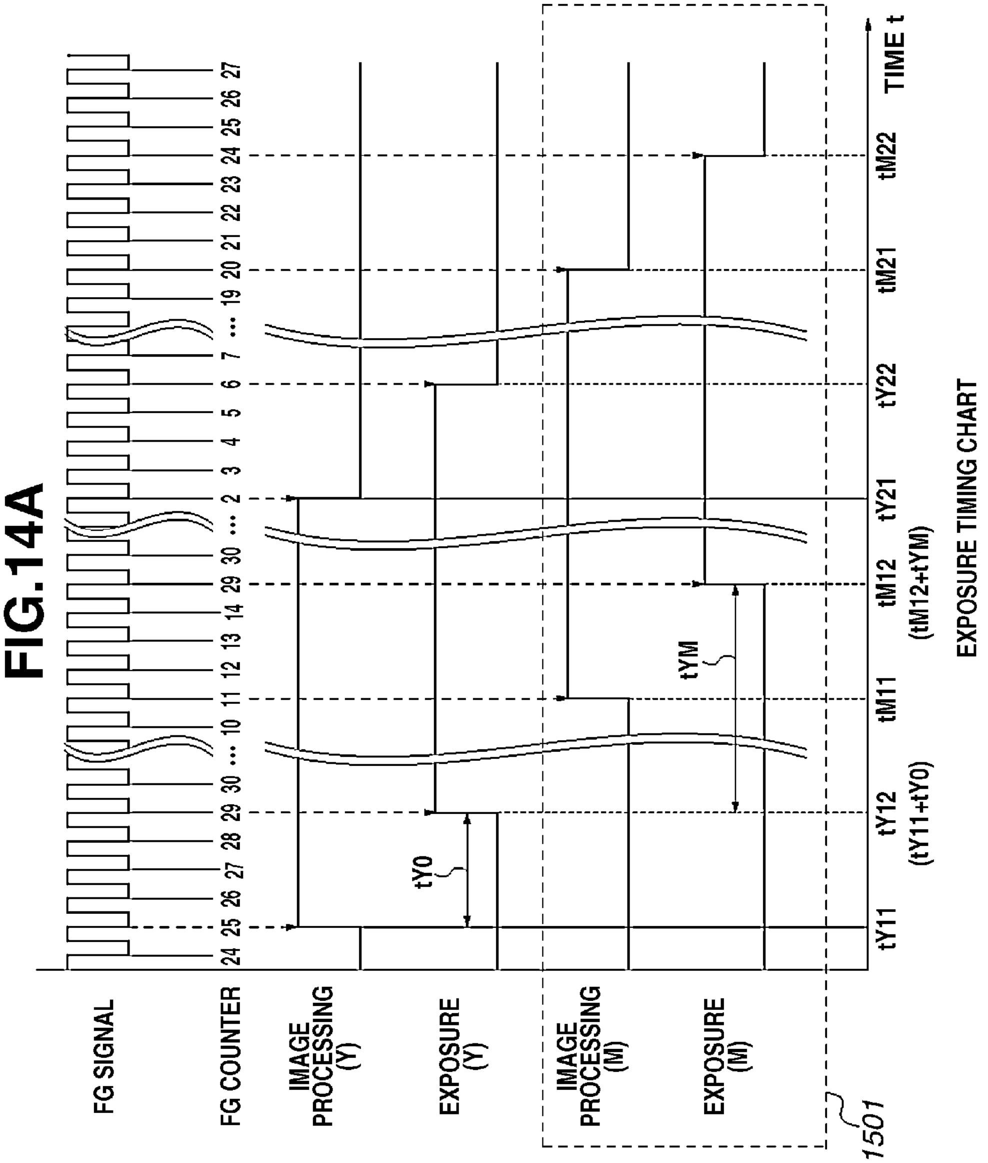
FIGS. 14A and 14B are timing charts illustrating exemplary image data correction processing and exposure processing.

FIG. 14A is a timing chart illustrating an example of image data correction processing and exposure processing executed according to the phase of rotation unevenness of the motor 6. More specifically, FIG. 14A is a timing chart illustrating an example of image data correction processing for one page.

Figure 14B:
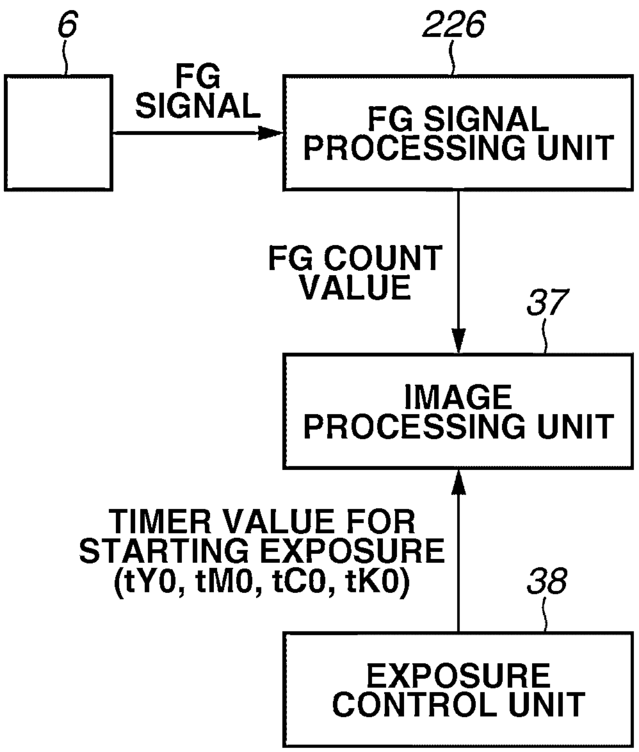

By executing the processing illustrated in the timing charts of FIGS. 14A and 14B, the present exemplary embodiment can correct banding occurring on the image by using density correction information, which is stored in the correction table illustrated in FIGS. 11A through 11C, according to the phase of rotation unevenness of the motor 6. FIG. 14B is a block diagram of main functional units related to the processing illustrated in FIG. 14A. The same units as those illustrated in FIGS. 6A and 6B are provided with the same reference numerals and symbols. Now, the processing will be described in detail below.

Referring to FIG. 14A, at timing tY11, the image processing unit 37 receives, from the exposure control unit 38, a notification for starting the exposure after tY0 seconds from the notification. At this timing, the image processing unit 37 serially receives FG count values from the FG signal processing unit 226. The image processing unit 37 calculates an FG count value at timing tY12, which is tY0 seconds later than the above-described notification, according to the FG count value at the timing tY11, at which the notification is received from the exposure control unit 38. In the example illustrated in FIGS. 14A and 14B, the FG count value at the timing of receipt of the notification is “25”. Furthermore, the calculated FG count value at the time of the exposure is “29”.

In addition, the CPU 221 reads the corresponding density correction information from the exposure output correction table illustrated in FIGS. 11A through 11C according to the calculated FG count value at the time of the exposure. Furthermore, the CPU 221 executes the correction of the density (the correction of banding) on the image on the first scan line. The processing executed for the color of yellow, which is described above, may be performed on the colors other than yellow to correct the density thereof.

If the photosensitive drum 22 for yellow and magenta are driven in common by the motor 6, it is useful to execute the following processing. The relationship of the timing of exposure between the colors of yellow and the other colors (e.g., magenta or the like) is fixed. Accordingly, the CPU 221 may calculate an FG count value at the timing of start of exposure for the other color (magenta or the like) according to the FG count value at the time of the notification from the exposure control unit 38 at the timing tY11.

A dotted line rectangular box frame 1501 corresponds to the above-described processing. In this case, it is also useful if the same FG count value is utilized in common to the colors of yellow and magenta. In the example illustrated in FIG. 14A, the relationship of the exposure timings for yellow and magenta has an interval tYM.

Accordingly, the phase of rotation unevenness of the motor at the time of the exposure for the color of magenta can be identified by adding the FG count value equivalent to the time interval tYM to the FG count value corresponding to the timing tY12. Furthermore, in this case, the CPU 221 may read the density correction information corresponding thereto from the exposure output correction table illustrated in FIGS. 11A through 11C. By executing the above-described method also, the CPU 221 according to the present exemplary embodiment can cause the scanner unit 24 to execute the exposure (at timings tM12 through tM22) that varies according to the phase of rotation unevenness of the motor 6 (corresponding to the phase of the density unevenness).

In the present exemplary embodiment, as described above with reference to FIG. 13, the CPU 221 sets the same FG count value (phase) on the plurality of scan lines that is scanned while the motor 6 rotates by 11.25 degrees. More specifically, the same FG count value as that for the first scan line, which is described above, is allocated to the plurality of scan lines, which corresponds to the rotation of the motor 6 by 11.25 degrees. In addition, a next FG count value is allocated on the plurality of scan lines, which corresponds to the next rotation of the motor 6 by 11.25 degrees.

It is also useful if the correction of density unevenness is executed in a unit narrower than the unit of FG count value. In this case, the CPU 221 can correct the density unevenness by allocating a narrowed down phase of rotation unevenness of the motor 6 on each scan line based on the FG count value.

The image processing unit 37 executes correction of density of the image data based on the density correction information read from exposure output correction table illustrated in FIGS. 11A through 11C according to the FG count value (the phase of rotation unevenness of the motor 6) allocated to each scan line.

By executing the correction of density in the above-described manner, the CPU 221 can control the scanner unit 24 to execute the exposure in which the phase of rotation unevenness of the motor 6 (corresponding to the phase of density unevenness) is varied during a time period from the timing tY12 to a timing tY22. The above-described exposure for the color of yellow, which is executed by the scanner unit 24, is executed for the colors other than yellow.

As described above, by executing the processing illustrated in FIGS. 12A and 12B, the present exemplary embodiment can effectively reduce or suppress the density unevenness (banding) that may occur due to the rotation unevenness of the motor by executing the density control in synchronization with the FG signal, which is the phase information about the motor. In addition, rotation unevenness in a plurality of types of periods may occur during one rotation of the motor. However, by executing the processing illustrated in the flow charts of FIGS. 12A and 12B, the present exemplary embodiment can effectively correct the density unevenness (banding) that may occur in this case.

Figure 15A:
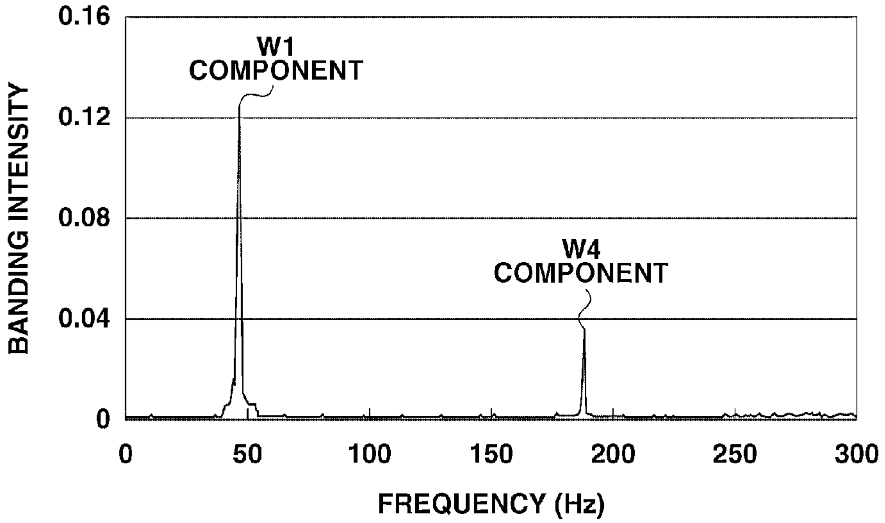
FIGS. 15A and 15B are a graph illustrating an effect of banding reduction.
Figure 15B:
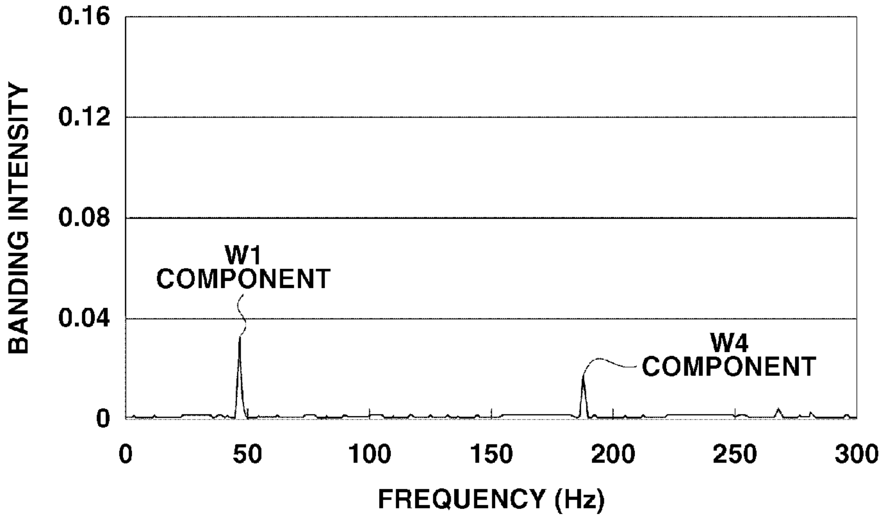

An effect of the above-described configuration will be described in detail below with reference to FIGS. 15A and 15B. FIG. 15A illustrates the density unevenness (banding) that may occur if the present exemplary embodiment is not applied. FIG. 15B illustrates the density unevenness (banding) that may occur if the present exemplary embodiment is applied. In FIGS. 15A and 15B, the intensity of banding is taken on a vertical axis. Referring to FIG. 15B, the intensity of banding in relation to the components W1 and W4 is reduced at the same time.

With the above-described configuration, the present exemplary embodiment can effectively reduce or suppress the density unevenness that may occur due to rotation unevenness of the motor. Considering the rotation unevenness of the motor 6, the same banding does not always occur at the same location on a recording paper. According to the present exemplary embodiment having the configuration described above, the density unevenness (banding) that may occur in this case can be appropriately corrected.

The present exemplary embodiment directly acquires a signal (FG signal in the description above) output for each rotation of motor to identify the phase of rotation unevenness of the motor. The present exemplary embodiment having this configuration is useful in the following case also. More specifically, if the gear ratio between the number of teeth of the pinion gear 305 of the motor and the number of teeth of another gear engaging therewith (e.g., a drum drive gear) has an integer value, the phase of rotation unevenness of the motor can be indirectly identified according to a result of detection of marking provided to the gear engaging the pinion gear 305 of the motor.

The above-described configuration can be employed on the premise that the gear ratio of between the number of teeth of the pinion gear 305 of the motor and the number of teeth of another gear engaging the pinion gear 305 has an integer value. On the other hand, according to the present exemplary embodiment having the configuration described above, the phase of rotation unevenness of the motor can be identified while the mechanical configuration of the present invention is not restricted by the numbers of teeth of the gears. With the above-described configuration, the present exemplary embodiment can secure a highly free mechanical design of the gears.

In the first exemplary embodiment described above, the CPU 221 executes the correction by using the density characteristic that is an inverse of the density unevenness so that the density unevenness that has occurred due to the rotation unevenness of the motor is offset. More specifically, in the above-described first exemplary embodiment, if the density has become high due to the density unevenness, the CPU 221 executes control of the image forming unit for performing correction for reducing the density. However, the present invention is not limited to this for the correction of the density by the image forming unit.

More specifically, it is also useful, in order to cancel the deviation of banding from an ideal location of a scan line, if the barycenter of the image on each scan line is corrected by using the density to correct the location of the scan line by executing pseudo-processing. In this case, the CPU 221 detects the density unevenness having the components W1 and W4 by using the density sensor 241. In detecting the density unevenness, the same processing for associating the density unevenness and the phase of the rotation unevenness of the motor 6 as described above is executed in the present exemplary embodiment.

In addition, the CPU 221 uses a correction table to calculate a pitch interval between scan lines according to the magnitude of the density. More specifically, the present exemplary embodiment can acquire the correspondence relation between the pitch interval between the scan lines and the phase of rotation unevenness of the motor 6. Furthermore, in order to correct unevenness of the pitch interval to an ideal interval by the pseudo-processing, the CPU 221 corrects the barycenter of the image according to the variation of density (by correcting the density) on each scan line. Now, the processing will be described in detail below.

<Flow Chart of Exposure Output Correction Table Generation Processing>

Figure 16:
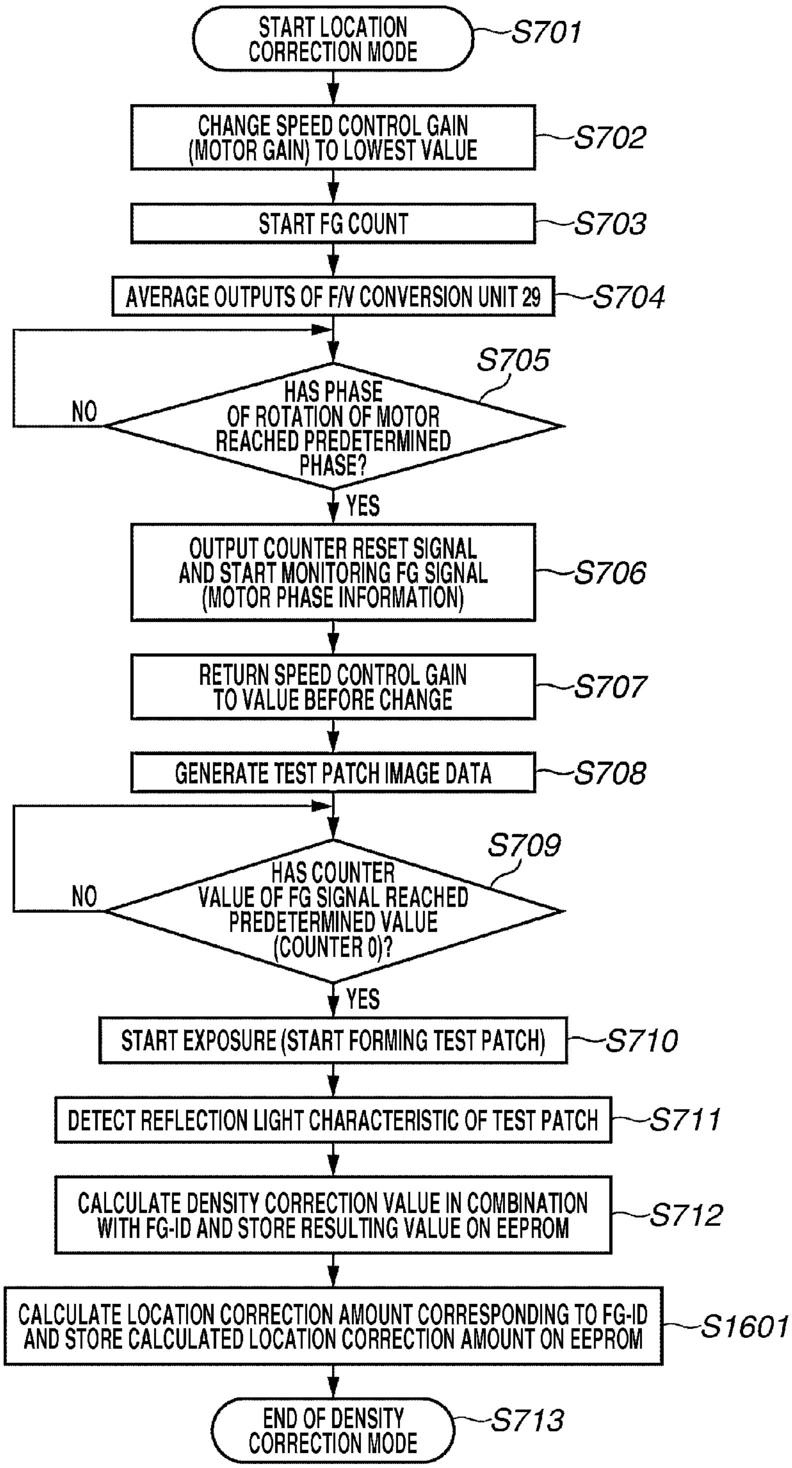
FIG. 16 is a flow chart illustrating an example of processing for generating an exposure output correction table.

FIG. 16 illustrates an example of processing for generating an exposure output correction table according to the second exemplary embodiment of the present invention. More specifically, FIG. 16 is a flow chart illustrating an example of processing for generating a table storing relationship between information about the phase of the motor and a location correction amount. Processing in steps S702 through S712 is the same as that described above in the first exemplary embodiment. Accordingly, the description thereof will not be repeated here. In the present exemplary embodiment, the point of difference from the first exemplary embodiment (the processing in step S1601) will be primarily described in detail.

In step S1601, the correction information generation unit 36 (FIG. 6) calculates a location correction amount ΔP'n corresponding to each FG count value (FG-ID). In addition, the correction information generation unit 36 stores the correspondence relation between the calculated location correction amount ΔP'n and the FG count value on the EEPROM. In the present exemplary embodiment also, the FG count value functions as the phase information indicating the phase of the variation of the rotation speed of a rotation member (e.g., the motor). The phase information is not limited to the FG count value. However, the FG count value is used as an example of the phase information of the present invention.

Now, the processing in step S1601 will be described in detail below. To begin with, the correction information generation unit 36 calculates a line interval deviation (correction) amount ΔLn based on the density difference ΔDn. The density difference ΔDn, which is associated with the FG count value, is a value calculated by executing the processing in step S711 (FIG. 16). It is useful if any difference value, such as difference values Δd1 and Δd2, which are difference values between each density value and the average value described above with reference to FIGS. 11A and 11B in the first exemplary embodiment or the total difference value stored in the table C illustrated in FIG. 11C is used as the density difference value ΔDn. In the following description, the total difference value stored in the table C illustrated in FIG. 11C is used as the density difference value ΔDn.

More specifically, the correction information generation unit 36 refers to the table storing the density difference value ΔDn and the line interval deviation (correction) amount ΔLn associated with each other. Furthermore, the correction information generation unit 36 calculates the line interval deviation (correction) amount ΔLn corresponding to the density difference value ΔDn. The line interval deviation (correction) amount ΔLn indicates an amount of deviation of the interval between the scan lines scanned by the scanner unit 24 from the ideal interval between them on an image bearing member, such as an intermediate transfer belt. FIG. 17A illustrates an example of a table storing mutually associated density difference value ΔDn and line interval deviation (correction) amount ΔLn. The example illustrated in FIG. 17A will be described in detail below.

The correction information generation unit 36 accumulates the line interval deviation (correction) amount ΔLn to calculate cumulative location variation ΔLnS. In addition, the correction information generation unit 36 calculates a location variation amount ΔPn corresponding to the calculated cumulative location variation ΔLnS. Furthermore, the correction information generation unit 36 calculates a location correction amount ΔP'n, which has an opposite sign of the sign of the location variation amount ΔPn. More specifically, in the present exemplary embodiment, the location correction amount ΔP'n, which is associated with each FG count value, is set to a value with which the cumulative location variation ΔLnS can be cancelled. Moreover, the scanner unit 24 executes the exposure according to the above-described setting.

<Processing for Generating Table Storing Relationship Between Density Difference Value ΔDn and Line Interval Adjustment Amount ΔLn>

Now, processing for generating a table storing relationship between the density difference value ΔDn and the line interval deviation (correction) amount ΔLn will be described in detail below. At first, an image illustrated in FIG. 17B is formed on the intermediate transfer member 27. In the example illustrated in FIG. 17B, unevenness of the intervals between the formed line images has occurred due to the affect from the rotation unevenness of the motor (rotation member) when line image information having constant intervals is input to the image forming apparatus.

The intervals between the line images formed on the intermediate transfer member 27 are measured by using a dedicated measurement device, which is provided separately from the image forming apparatus to calculate a deviation value, which indicates the amount of deviation from the ideal interval. The calculation is executed by a computer that stores a measured value measured by the dedicated measurement device.

On the other hand, the density (see FIG. 17C) of the image (see FIG. 17B) is measured by the separately provided dedicated measurement device. The result of the measurement is input to the computer. After measuring a density measurement value, the computer calculates a difference between each input density value and an average density value of the density values as a density difference value ΔDn. In other words, the example illustrated in FIG. 17C illustrates a result of measurement of the density in this case. In the example illustrated in FIG. 17C, the density value is taken on the vertical axis while the location of the image in the conveyance direction (location of movement) is taken on the horizontal axis. More specifically, in the example illustrated in FIG. 17C, the density at each location in the conveyance direction when an image of an even density is input is illustrated. In the example illustrated in FIG. 17C, the density periodically varies due to the rotation unevenness of the motor.

Furthermore, the above-described computer associates the calculated line interval deviation (correction) amount ΔLn with the density difference value ΔDn at the corresponding image location. In addition, the above-described computer generates a table used for predicting how much density difference value ΔDn causes how much line interval deviation (correction) amount ΔLn. FIG. 17A illustrates an example of the table generated by the above-described computer.

However, the table illustrated in FIG. 17A is a mere example. More specifically, it is also useful if the line interval deviation (correction) amount ΔLn is associated with the density difference value ΔDn that has been divided smaller. It is also useful if interpolation processing is executed based on the density difference value ΔDn stored in the table illustrated in FIG. 17A to calculate the line interval deviation (correction) amount ΔLn. The table illustrated in FIG. 17A is previously stored on the EEPROM of the storage unit 200 of the image forming apparatus.

<Calculation of Location Correction Amount ΔP'n>

Now, a method for calculating the location correction amount ΔP'n based on the density unevenness information (the density difference value ΔDn), which is executed within a color image forming apparatus, will be described in detail below. More specifically, immediately before starting image forming (e.g., the time period between the timings tY11 and tY12 illustrated in FIG. 14A), the present exemplary embodiment calculates each FG count value and a cumulative location variation ΔLnS, which is associated with the FG count value. In addition, the present exemplary embodiment converts the cumulative location variation ΔLnS into the location variation amount ΔPn. Furthermore, the present exemplary embodiment calculates the location correction amount ΔP'n, which has a sign opposite to the location variation amount ΔPn. Moreover, the present exemplary embodiment generates the table storing the correspondence relation between each FG count value and the location correction amount ΔP'n.

In addition, the correction information generation unit 36 refers to the table generated in the above-described manner to calculate the location correction amount ΔP'n based on the FG count value allocated to each scan line. More specifically, the correction information generation unit 36 calculates the correction amount for sufficiently correcting the location of each scan line in the sub scanning direction to the ideal location. In addition, the image processing unit 37 executes image processing for correcting the location on each scan line image according to the calculated location correction amount ΔP'n corresponding to each scan line. After the image processing is completed, the exposure control unit 38 executes the same exposure control as that described above in the first exemplary embodiment and the scanner unit 24 executes the same exposure processing as that described above in the first exemplary embodiment.

The cumulative location variation ΔLnS will be described in detail below. In the present exemplary embodiment, the cumulative location variation ΔLnS is determined with the location of the scan line in the sub scanning direction, which is a starting point of the scan line, as its reference. Accordingly, the cumulative location variation ΔLnS corresponding to each FG count value may vary according to what state of variation of density (the phase of variation of location) is used as the reference. More specifically, as indicated by a portion 1701 illustrated in FIG. 17C, if the first scan line is handled when the density value is lowest, the cumulative location variation ΔLnS is affected (reduced) in an initial stage of the processing to be executed later. On the other hand, as indicated by a portion 1702 illustrated in FIG. 17C, if the first scan line is handled when the density value is highest, then the cumulative location variation ΔLnS is increased in the initial stage of the processing to be executed later. In other words, the cumulative location variation ΔLnS corresponding to an arbitrary FG count value n, which is an FG count value acquired after the scanning of the image with the laser beam is started in a state where n=m, can be calculated by the following expressions 1 and 2:

$$\Delta LnS = \sum_{i=0}^{n} \Delta Li - \sum_{i=0}^{m} \Delta Li \quad (m \leqq n \leqq N) \tag{1}$$

$$\Delta LnS = \sum_{i=0}^{N} \Delta Li + \sum_{i=0}^{n} \Delta Li - \sum_{i=0}^{m} \Delta Li \ (0 \leqq n \leqq m-1) \tag{2}$$

where "ΔLi" denotes the line interval deviation amount ΔLn when n=i, and "N" in the expression (2) denotes a maximum value of the FG count value, which has a value "31" in the present exemplary embodiment.

Each of the expressions (1) and (2) uses a location when the FG count value is "0" as the reference. Furthermore, the present exemplary embodiment reduces the cumulative location variation occurring in a range from the reference location to the location at which an FG count value m is acquired from the total cumulative location variation, which is a total of the variation of location that may occur in a range from the reference location to the location at which an FG count value n is acquired.

Then, the correction information generation unit 36 previously generates a table storing each density difference value ΔDn and line interval deviation (correction) amount ΔLn associated with each other by using the table illustrated in FIG. 17A described above by referring to the table C illustrated in FIG. 11C. Furthermore, the correction information generation unit 36 stores the mutually associated density difference value ΔDn and line interval deviation (correction) amount ΔLn on the EEPROM. The table illustrated in FIG. 18 indicates the table described above. In the table, each density difference value ΔDn and line interval deviation (correction) amount ΔLn are associated with each other. In addition, density difference value ΔDn is a density difference between the combined density of W1 and W4, and the average density, similar to the first exemplary embodiment.

In addition, as described above in the first exemplary embodiment, the image processing unit 37 receives a notification from the exposure control unit 38 indicating that the exposure is to be started tY0 seconds later than the timing tY11. When the notification is received, the image processing unit 37 identifies the FG count value at the timing tY12, which is the timing later than the timing tY11 by tY0 seconds (the exposure start timing) by executing the processing similar to the processing described above with reference to FIGS. 14A and 14B. In the present exemplary embodiment, it is supposed that the FG count value to be identified is "3". Now, the processing executed when m=3 will be described in detail below.

In this case, the correction information generation unit 36 sets a value m (=3) as the value of the identified FG count value. In addition, the correction information generation unit 36 calculates the cumulative location variation ΔLnS, which corresponds to each FG count value during one period, with the timing at which the value n=m by using and referring to the expressions (1) and (2) and the table illustrated in FIG. 18. If n=5, then the following expression holds based on the above-described expression (1):

$$\Delta L5S = \sum_{n=0}^{5} \Delta Li - \sum_{n=0}^{3} \Delta Li = -13.419 - (-8.396) = -5.023$$

FIG. 19 illustrates a result of calculating the cumulative location variation ΔLnS, which corresponds to each FG count value during one period when m=3. Referring to FIG. 19, a column 1901 includes the cumulative location variation ΔLnS corresponds to each FG count value when the scanning of the image with the laser beam is started when the FG count value has a value "3".

Then, the correction information generation unit 36 uses the cumulative location variation ΔLnS and information about an output resolution of the color image forming apparatus to calculate the location variation amount (hereinafter referred to as a "location variation amount ΔPn").

If the output resolution of the color image forming apparatus is 600 dots per inch (dpi) and if the dimension of one isolated dot is 42 μm, then the location variation amount ΔPn is a value calculated by dividing the cumulative location variation ΔLnS by the diameter of the one isolated dot (42 μm). More specifically, the location variation amount ΔPn can be calculated by the following expression (3):

$$\Delta Pn = \Delta Lns/42\ (\mu m) \qquad (3)$$

In the example illustrated in FIG. 19, a field 1902 stores a numerical value, which is a result of the calculation executed by the correction information generation unit 36 by dividing cumulative location variation ΔLnS by the location variation amount ΔPn. Furthermore, the correction information generation unit 36 multiplies the location variation amount ΔPn by a numerical value "−1" to calculate the location correction amount ΔP'n, which has a sign opposite from the sign of the location variation amount ΔPn. The location correction amount ΔP'n indicates the amount of location correction to be executed. In step S1601, the correction information generation unit 36 stores a table (including a column 1903) storing the location correction amount ΔP'n and the FG count value associated with each other and stored in the column 1903 illustrated in FIG. 19 on the EEPROM.

In actual image formation processing (the exposure processing), the correction information generation unit 36 refers to the table 1903 illustrated in FIG. 19, and allocates the location correction amount ΔP'n to each scan line image according to the FG count value allocated to each scan line. Furthermore, the image processing unit 37 executes image processing according to the location correction amount ΔP'n on each scan line image. The exposure processing by the exposure control unit 38 and the scanner unit 24 is executed based on the processed scan line image. In the present exemplary embodiment, the exposure processing itself is the same as the exposure processing in the first exemplary embodiment described above.

<Image Processing for Correcting Location of Barycenter of Image>

Figure 20A:
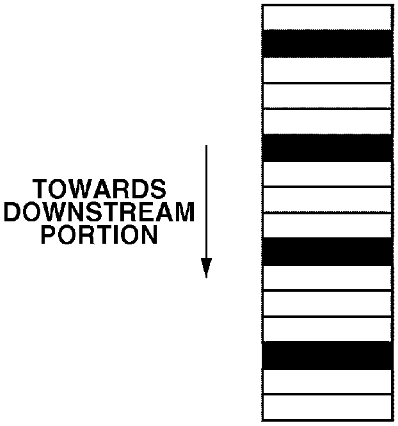
FIGS. 20A through 20G illustrate an example of image processing for correcting a location of an image barycenter.
Figure 20B:
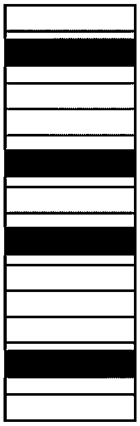

Now, a method for actually executing the image processing on the calculated location correction amount ΔP'n and for correcting the location of the barycenter of an image will be described in detail below with reference to FIGS. 20A through 20G. FIG. 20A illustrates an image located at the ideal location. FIG. 20B illustrates a state in which the image has been formed at a location deviated from the ideal location by the deviation amount equivalent to the number of lines of the location variation amount ΔPn due to the affect from the variation of the rotation speed (the rotation unevenness) that may periodically occur. If the value of the location variation amount ΔPn included in the field 1902 (FIG. 19) has a positive sign, then the image is formed at a location deviated from the ideal location by the deviation amount equivalent to the number of lines indicated by the location variation amount ΔPn in the direction opposite to the image scanning start location (towards the downstream side). On the other hand, if the value of the location variation amount ΔPn has a negative sign, then the image is formed at a location deviated from the ideal location by the deviation amount equivalent to the number of lines indicated by the location variation amount ΔPn in the direction towards the image scanning start location (towards the upstream side). In the example illustrated in FIG. 19, if the FG count value has a value "1", then the image is formed at a location deviated from the ideal location by 0.154 lines.

Figure 20C:
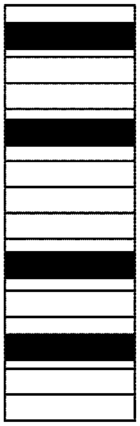

FIG. 20C illustrates a state in which the location at which the image is formed is shifted upstream by the correction amount equivalent to 0.2 lines if the location of forming the image has been deviated from the ideal location by 0.2 lines in the downstream direction. The image processing unit 37 executes correction of the image forming location by executing image correction processing according to the location correction amount ΔP'n in order to cancel the deviation of the location of the image from the ideal location by the location variation amount ΔPn.

Figure 20D:
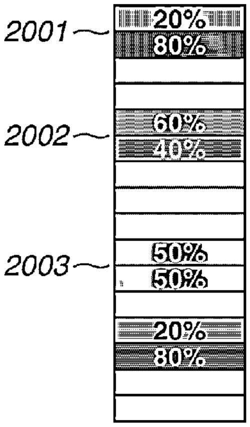
Figure 20E:
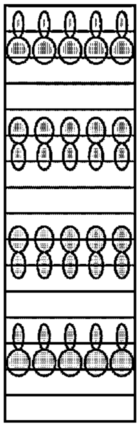
Figure 20F:
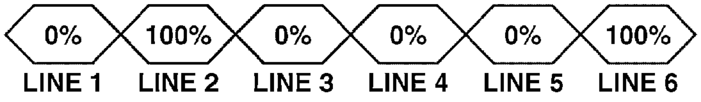
Figure 20G:
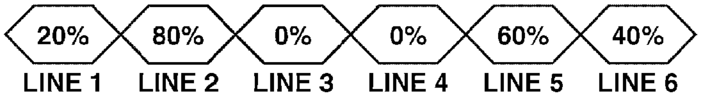

In the present exemplary embodiment, the deviation amount (the correction amount) equivalent to "0.2 lines" is smaller than the deviation amount of one line. Accordingly, the present exemplary embodiment changes the location of forming the image by executing the pseudo-processing by using the two lines as illustrated in FIG. 20D. In order to shift the image forming location in the upstream direction by the correction amount equivalent to 0.2 lines, it is useful to set the image density of the first line of the two lines to 20% and set the image density of the second lines of the two lines to 80% as indicated by a portion 2001 in FIG. 20D. The correction of the image density executed by the image processing unit 37 is executed in the similar manner on each image existing on the same line. Referring to FIG. 20D, a portion 2002 indicates an image formed at a location shifted by 0.6 lines in the upstream direction. In addition, a portion 2003 indicates an image formed at a location shifted by 0.5 lines in the downstream direction. FIG. 20E illustrates an example of a latent image (a pattern scanned by the laser beam) formed in this case. By executing the image forming processing as illustrated in FIG. 20E, the image forming location is corrected to the ideal location on the scan line. FIGS. 20F and 20G illustrate an example of image data on each line before the correction and after the correction.

By executing the processing described above, the present exemplary embodiment can cause the scanner unit 24 to execute the exposure in which the location of forming an image is corrected according to the phase of variation of the rotation speed of the motor (the rotation unevenness) that may periodically occur. Accordingly, the present exemplary embodiment can correct the pitch unevenness to the ideal interval by executing the pseudo-processing for correcting the barycenter of the image according to the variation of the location on each scan line. It was verified that the present invention can appropriately reduce or suppress the banding without performing the correction of the location of the barycenter of an image by the image processing on each ΔP'n illustrated in the column 1903 of FIG. 19, very precisely.

A phenomenon of banding may be caused by the deviation of the location of forming a scan line image from the ideal location. In each exemplary embodiment the present invention, the location deviation can be solved by executing the image processing including the correction of the image density.

Suppose that the number of bits of the gradation related to the correction of density is 4 bits or smaller. The density can be adjusted by approximately 6.7% for one bit. In this state, by executing the density correction including the location correction processing, the present invention can achieve a high quality image whose density has been appropriately corrected, in which case a user of the image forming apparatus can feel that the image has a very high quality. The present invention can achieve a very high quality image due to the following reasons. If the image barycenter is moved in the sub scanning direction by 6.7%, the movement of the barycenter is equivalent to the correction of density by a value smaller than 6.7%. More specifically, if the number of bits of gradation related to density correction is as small as 4 bits or smaller, the present invention can achieve the density correction at a high accuracy with the correction of image forming location executed at a precision not so high.

Now, a modification of the above-described exemplary embodiment of the present invention will be described in detail below. In each of the exemplary embodiment of the present invention described above, the CPU 221 executes control for forming a patch on the intermediate transfer member 27. However, the present invention is not limited to this. More specifically, it is also useful if a patch is formed on a transfer material conveyance belt (transfer material bearing member). In other words, each exemplary embodiment of the present invention can be applied to an image forming apparatus that employs a primary transfer method for directly transferring the toner image developed on the photosensitive drum 22 onto a recording material.

In this case, the transfer material conveyance belt (transfer material bearing member), onto which the toner image developed on the photosensitive drum 22 is directly primarily transferred, is used as a member onto which a patch is formed instead of the intermediate transfer member 27 according to each exemplary embodiment described above. It is also useful if a patch is formed on the surface of the photosensitive drum. In this case, the surface of the photosensitive drum 22 is used as the member onto which a patch is formed instead of the intermediate transfer member 27 according to each exemplary embodiment of the present invention described above.

In each exemplary embodiment of the present invention described above, the motor drives the photosensitive drum. However, the present invention is not limited to this. More specifically, each exemplary embodiment of the present invention can employ a rotation member related to image forming other than the photosensitive drum. In this case, it is also useful if the following configuration is employed. More specifically, in this case, the CPU 221 executes processing, similar to the density correction in relation to the components W1 and W4 described above, on the frequency of rotation unevenness of a motor that drives the development roller and the motor that drives a roller for driving an intermediate transfer belt to correct the density unevenness that may occur due to the rotation unevenness of the motors.

In addition, each exemplary embodiment of the present invention can be applied to a motor that drives a transfer material conveyance belt. The case of employing a motor that drives a development roller will be briefly described below with reference to FIGS. 10A through 10C. In this case, it is useful if the phase of rotation unevenness of the motor that drives the development roller instead of each of the phases θ1 and θ2. Furthermore, in this case, it is useful to execute the processing similar to that described above for the phase of rotation unevenness of the motor that drives the development roller. The same configuration can be applied if a motor other than the motor that drives the photosensitive drum or the development roller is used.

In each exemplary embodiment, the CPU 221 associates the phase of the motor during the exposure with density unevenness correction information, and stores the mutually associated phase of the motor during the exposure and the density unevenness correction information on the EEPROM. However, the present invention is not limited to this. More specifically, it is also useful if the CPU 221 associates the phase of the motor during the transfer, which can be predicted at the timing of exposure, or the phase of the motor at an arbitrary timing after exposure and before transfer, which can be predicted at the timing of exposure, with the density unevenness correction information. However, in this case, the above-described phase is employed as the phase on the scan line Ln, which is determined in step S1204, or the phase that is used as a trigger of exposure in step S1208.

In each exemplary embodiment of the present invention, in step S1213, the CPU 221 serially counts the FG count values (equivalent to the FG signals). However, the present invention is not limited to this. More specifically, it is also useful if the following configuration is employed. More specifically, in this case, at the timing t3 in the timing chart illustrated in FIG. 8, on the premise that the state can be reproduced, 211 allocates an arbitrary or predetermined state of rotation speed of the motor 6 to a specific phase of the motor 6. Furthermore, the CPU 221 identifies the variation of the phase of the motor 6 from the specific phase thereof according to the time elapsed since the timing t3.

This is because if the time taken for the motor 6 to rotate by one revolution is constant or substantially constant, then the FG count value can be associated with the elapsed time. The same applies to a case where the FFT analysis unit described above is provided and the phase of the motor 6 at a specific timing, which is identified when the frequency of the FG signal is analyzed by the FFT analysis unit, is used as the basis.

As described above, it is also useful if the CPU 221 allocates an arbitrary or predetermined phase to the state of an arbitrary or predetermined rotation speed of the motor 6 and identifies the variation of the phase of the motor 6 based on the level of a parameter for operating the printer that has increased (been counted) from that in the state of the rotation speed to which the phase has been allocated.

In each exemplary embodiment of the present invention, in the examples illustrated in FIGS. 11A through 11C, the CPU 221 stores the phase information about the motor 6 and the density correction information in the table. However, the present invention is not limited to this. More specifically, it is also useful if the phase information about the motor 6 is input and the CPU 221 calculates an arithmetic expression for outputting the density correction information and stores the input and the arithmetic expression on the EEPROM.

Furthermore, in each exemplary embodiment of the present invention, the CPU 221 generates the correction information illustrated in FIGS. 11A through 11C according to a result of the measurement by the density sensor 241 for the test patch. However, the present invention is not limited to this. More specifically, it is also useful if the CPU 221 allocates predetermined correction information to each phase of rotation unevenness of the motor 6. The present exemplary embodiment may utilize the correction information, which has been previously calculated by execute the processing in the flowchart of FIG. 7 at the manufacture or design of the image forming apparatus.

Moreover, in each exemplary embodiment of the present invention, the banding is reduced by executing the control of the exposure executed by the scanner unit 24. However, the present invention is not limited to this. More specifically, if the response of the charging bias of the charging unit 23 and the development bias of the development unit 26 is sufficiently high, it is also useful if the CPU 221 controls the charging bias and the development bias so that the same effect of the exposure control described above can be achieved. By executing control of various image forming conditions also, the present exemplary embodiment can cause the image forming unit to execute image forming in which the density is corrected according to the phase of rotation unevenness of the motor. In this case also, the same effect as that achieved by executing the control of exposure executed by the scanner unit 24 can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image forming apparatus including an image forming unit configured to execute image forming and a motor configured to drive a rotation member included in the image forming unit for image forming, the image forming apparatus comprising:

a generation unit configured to generate information of variation that indicates a variation of rotation speed of the motor corresponding to each of a plurality of rotational phases of the motor based on a signal that is output at least once during one rotation of the motor; and a control unit configured to cause the image forming unit to execute image forming including correction of a density based on the information of variation, wherein the generation unit obtains an average value of the variation of rotation speed of the motor and obtains a variation of rotation speed of the motor corresponding to each of a plurality of rotational phases of the motor based on the average value.

2. The image forming apparatus according to claim 1, wherein the generation unit is configured to identify a change of the variation of rotation speed of the motor based on a plurality of signals of the motor to be output in response to one rotation of the motor.

3. The image forming apparatus according to claim 1, wherein the control unit is configured to cause the image forming unit to execute exposure according to information on an image with the corrected density.

4. The image forming apparatus according to claim 1, wherein any phase is allocated to an arbitrary state or a predetermined state of the speed of the motor, and the phase of the variation of the rotation speed is identified based on a parameter for operating a printer from the state of the speed to which the phase is allocated.

5. The image forming apparatus according to claim 1, wherein the rotation speed varies with a period of one rotation of the motor or with a period of one-nth, n being an integer, of the period of one rotation of the motor.

6. The image forming apparatus according to claim 1, further comprising:

a test patch forming unit configured to form a test patch;

an association unit configured to associate a phase of the information of variation when the test patch is formed with each position along a direction in which the test patch is moved;

a detection unit configured to detect a characteristic of light reflected from the test patch; and a correction information generation unit configured to generate correction information for correcting a density according to the phase of the information of variation based on association by the association unit and a result of detection by the detection unit, wherein the control unit is configured to cause the image forming unit to form an image with a density corrected based on the correction information.

7. The image forming apparatus according to claim 2, wherein the signal is information on the rotation speed of the motor, and the image forming apparatus further comprising:

a motor driving control unit configured to control driving the motor based on the information on the rotation speed of the motor.

8. The image forming apparatus according to claim 1, wherein the rotation includes the variation of the rotation speed in a plurality of periods, and wherein the control unit is configured to simultaneously correct the variation of the rotation speed in the plurality of periods.

9. The image forming apparatus according to claim 1, wherein the correction of the density is image processing for correcting a barycenter of an image.

10. The image forming apparatus according to claim 1, wherein a signal used for generating the information of variation according to the rotation state of the motor is an FG signal.

11. The image forming apparatus according to claim 1, wherein the variation of rotation speed of the motor corresponding to each of a plurality of rotational phases of the motor is a rotation unevenness of the motor.

12. The image forming apparatus according to claim 6, wherein the correction information generation unit obtains an average value of a plurality of pieces of density information that is a result of detecting the test patch and generates the correction information based on a difference between the average value and each of the density information.

13. The image forming apparatus according to claim 6, wherein the correction information generation unit obtains a first density information of the test patch according to a first cycle and a second density information of the test patch according to a second cycle that is shorter than the first cycle based on the detection result of the detection unit, and generates the correction information based on the first density information and the second density information.

14. An image forming method for an image forming apparatus including an image forming unit configured to execute image forming and a motor configured to drive a rotation member included in the image forming unit for image forming, the image forming method comprising:

generating information of variation that indicates a variation of rotation speed of the motor corresponding to each of a plurality of rotational phases of the motor based on a signal that is output at least once during one rotation of the motor;

causing the image forming unit to execute image forming including correction of a density based on the information of variation; and wherein generating information of variation comprises obtaining an average value of the variation of rotation speed of the motor and obtains a variation of rotation speed of the motor corresponding to each of a plurality of rotational phases of the motor based on the average value.

* * * * *